US012562162B1

(12) United States Patent
Chen et al.

(10) Patent No.: US 12,562,162 B1
(45) Date of Patent: Feb. 24, 2026

(54) EXPLANATION OF SYSTEM DETERMINATION

(71) Applicant: Amazon Technologies, Inc., Seattle, WA (US)

(72) Inventors: Zheng Chen, Seattle, WA (US); Chen Tong, Seattle, WA (US); Xing Fan, Redmond, WA (US); Michael Alan Frey, Washington, DC (US); Daniel Grace, Seattle, WA (US); Jie Hao, Bellevue, WA (US); Ziyan Jiang, Seattle, WA (US); Chenlei Guo, Redmond, WA (US); Aram Galstyan, Los Angeles, CA (US); Yang Liu, Los Altos, CA (US); Pradeep Natarajan, Chicago, IL (US)

(73) Assignee: Amazon Technologies, Inc., Seattle, WA (US)

( * ) Notice: Subject to any disclaimer, the term of this patent is extended or adjusted under 35 U.S.C. 154(b) by 356 days.

(21) Appl. No.: 18/129,412

(22) Filed: Mar. 31, 2023

(51) Int. Cl.
| | |
|---|---|
| *G10L 15/22* | (2006.01) |
| *G06F 16/635* | (2019.01) |
| *G10L 15/01* | (2013.01) |
| *G10L 15/06* | (2013.01) |
| *G10L 15/18* | (2013.01) |
| *G10L 15/30* | (2013.01) |

(52) U.S. Cl.
CPC ............ *G10L 15/22* (2013.01); *G06F 16/635* (2019.01); *G10L 15/01* (2013.01); *G10L 15/063* (2013.01); *G10L 15/1815* (2013.01); *G10L 2015/0635* (2013.01); *G10L 2015/225* (2013.01); *G10L 2015/227* (2013.01); *G10L 2015/228* (2013.01); *G10L 15/30* (2013.01)

(58) Field of Classification Search
CPC ....... G10L 15/22; G10L 15/01; G10L 15/063; G10L 15/1815; G10L 15/30; G10L 2015/0635; G10L 2015/225; G10L 2015/227; G10L 2015/228; G06F 16/635
See application file for complete search history.

(56) References Cited

U.S. PATENT DOCUMENTS

| | | | | |
|---|---|---|---|---|
| 11,074,907 | B1 * | 7/2021 | Mallikarjuniah | ... G10L 15/1815 |
| 11,158,308 | B1 * | 10/2021 | Bissell | .................... G10L 15/22 |
| 11,238,241 | B1 * | 2/2022 | Mallikarjuniah | ....... H04L 51/02 |
| 11,355,122 | B1 * | 6/2022 | Gonzalez | ................ G10L 21/10 |

(Continued)

*Primary Examiner* — Michael Colucci
(74) *Attorney, Agent, or Firm* — Pierce Atwood LLP

(57) ABSTRACT

Techniques for generating and outputting a natural language explanation of a determination made by a system are described. The system presents content to a user, where the content is generated based on a system determination. The system determines history data associated with a user profile associated with the user and context data associated with the system determination. The system uses the history data and the context data to determine a natural language explanation that the output was generated based on the system determination. The system further uses the history data and the context data to generate a predicted system determination representing the system determination that resulted in the output presented to the user. Based on a similarity between the predicted system determination and the actual system determination, the natural language explanation is presented to the user.

20 Claims, 14 Drawing Sheets

(56)     References Cited

U.S. PATENT DOCUMENTS

| | | | |
|---|---|---|---|
| 11,475,883 B1 * | 10/2022 | Mallikarjuniah | ... G10L 15/1815 |
| 2011/0054899 A1 * | 3/2011 | Phillips | ................... G10L 15/30 |
| | | | 704/235 |
| 2016/0035353 A1 * | 2/2016 | Chen | ........................ G10L 17/22 |
| | | | 704/235 |
| 2017/0371861 A1 * | 12/2017 | Barborak | .............. G06F 40/211 |
| 2020/0258046 A1 * | 8/2020 | Kolb | ....................... H04L 51/02 |
| 2020/0258506 A1 * | 8/2020 | Slifka | ................... G06F 40/295 |
| 2021/0398525 A1 * | 12/2021 | Mahmood | ............... G10L 15/22 |
| 2022/0189474 A1 * | 6/2022 | Sharifi | .................. G06F 3/0488 |
| 2024/0185834 A1 * | 6/2024 | Aharoni | .................. G10L 13/08 |

* cited by examiner

FIG. 1B

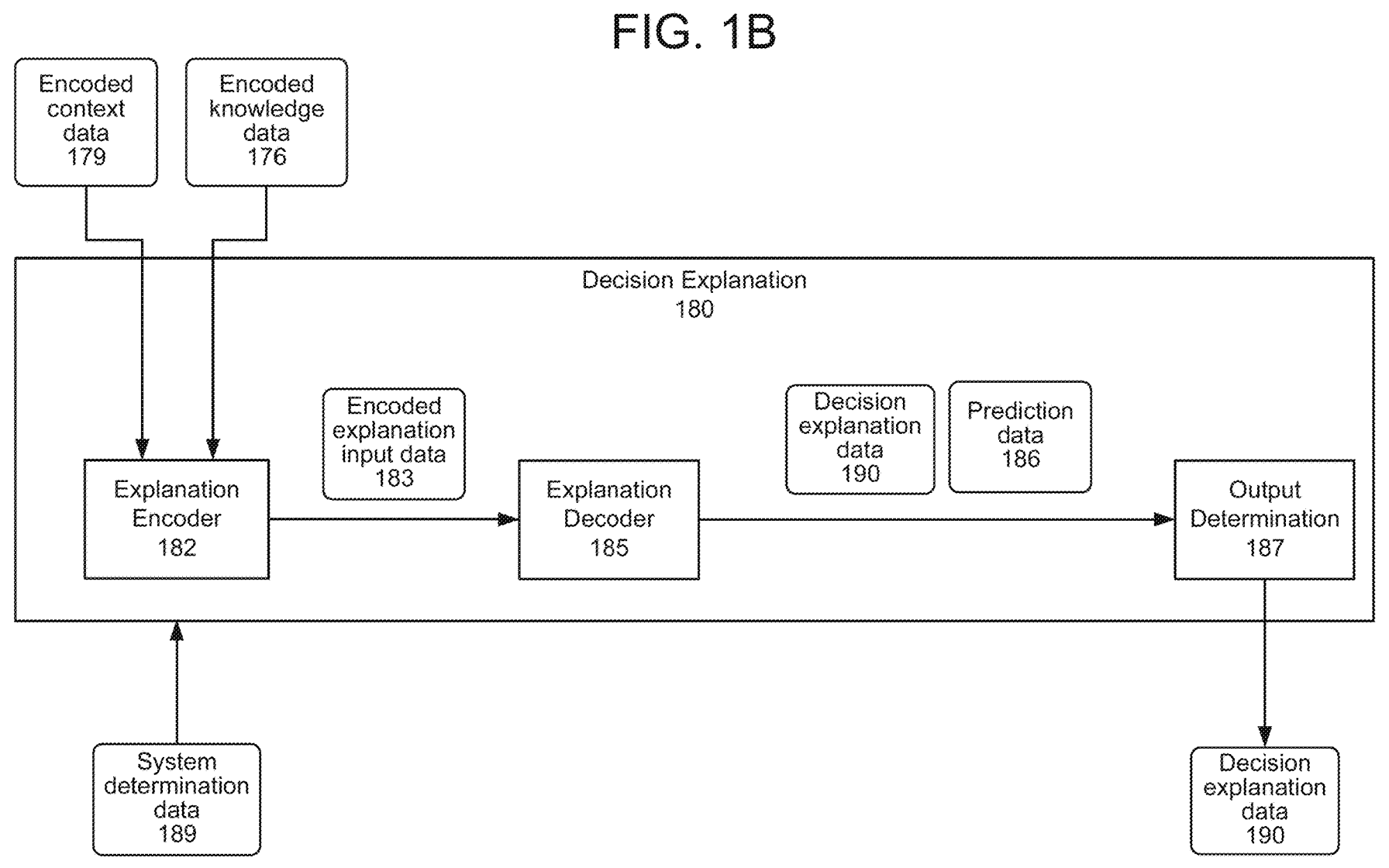

Decision Explanation
180

Output Determination
187

Decision explanation data
190

Prediction data
186

Decision explanation data
190

Explanation Decoder
185

Encoded explanation input data
183

Encoded knowledge data
176

Encoded context data
179

Explanation Encoder
182

System determination data
189

Figure 5:
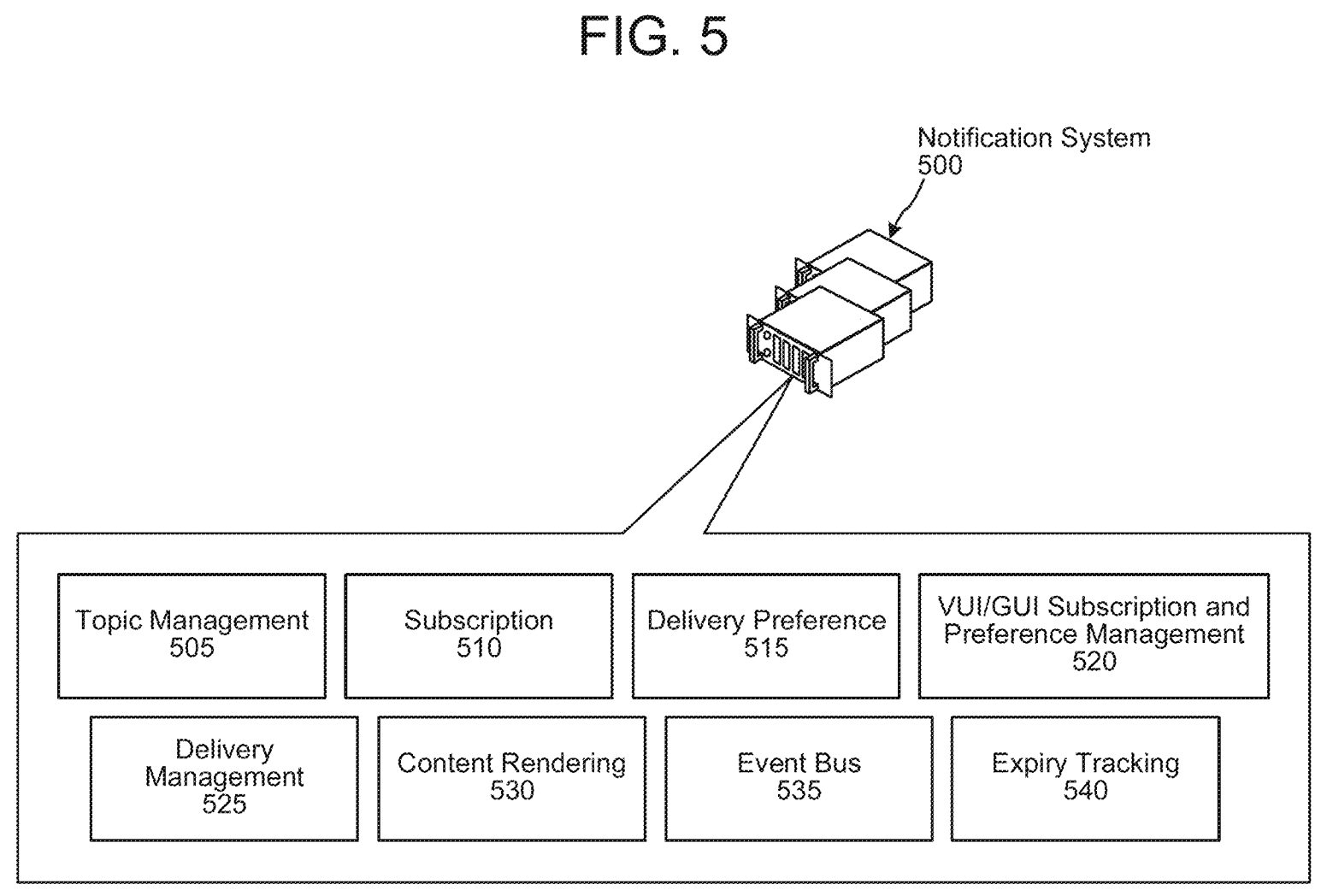

Notification System
500

VUI/GUI Subscription and Preference Management
520

Expiry Tracking
540

Delivery Preference
515

Event Bus
535

Subscription
510

Content Rendering
530

Topic Management
505

Delivery Management
525

FIG. 10

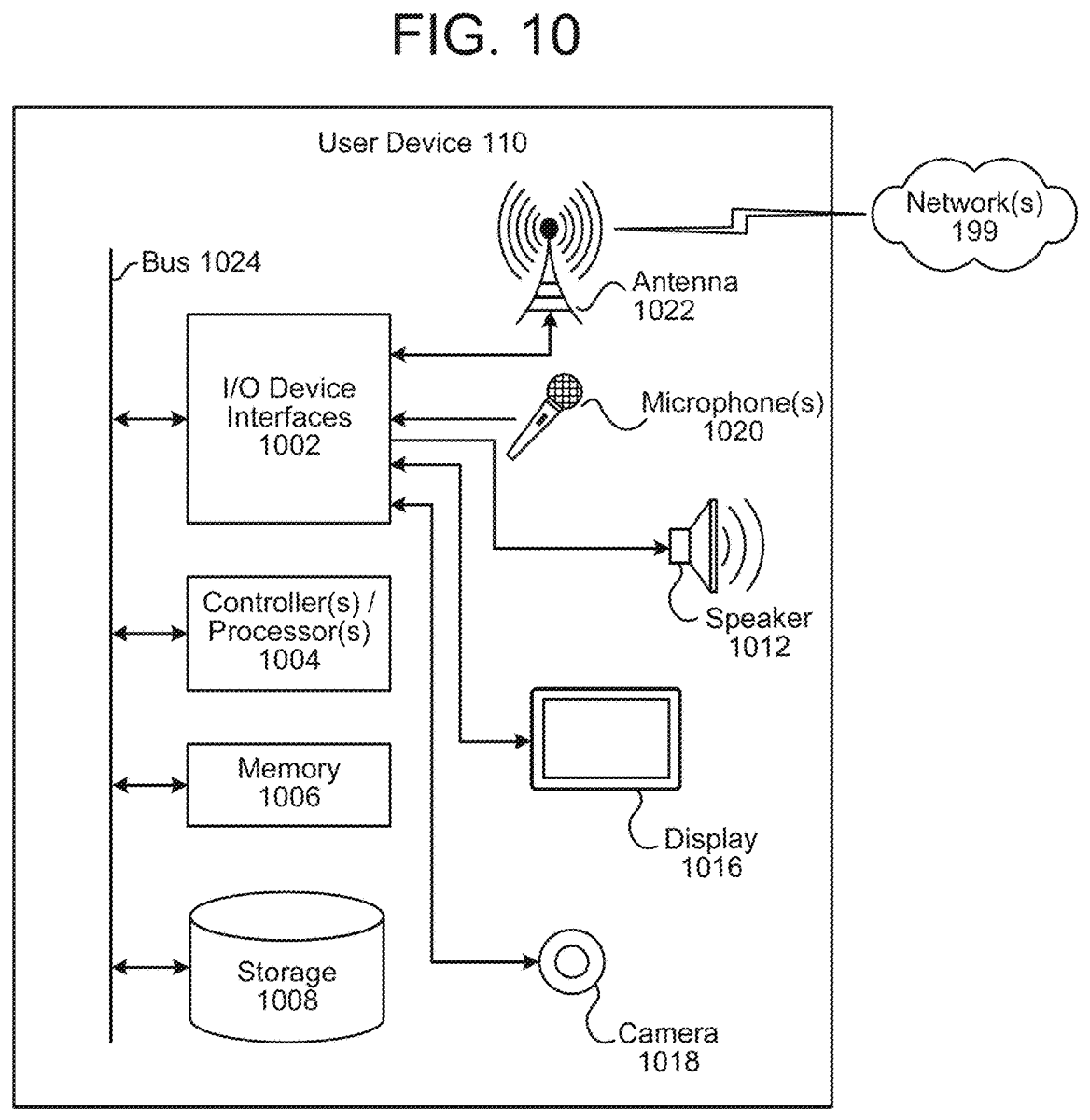

Network(s)
199

User Device 110

Antenna
1022

Microphone(s)
1020

Speaker
1012

Display
1016

Camera
1018

Bus 1024

I/O Device
Interfaces
1002

Controller(s) /
Processor(s)
1004

Memory
1006

Storage
1008

FIG. 11

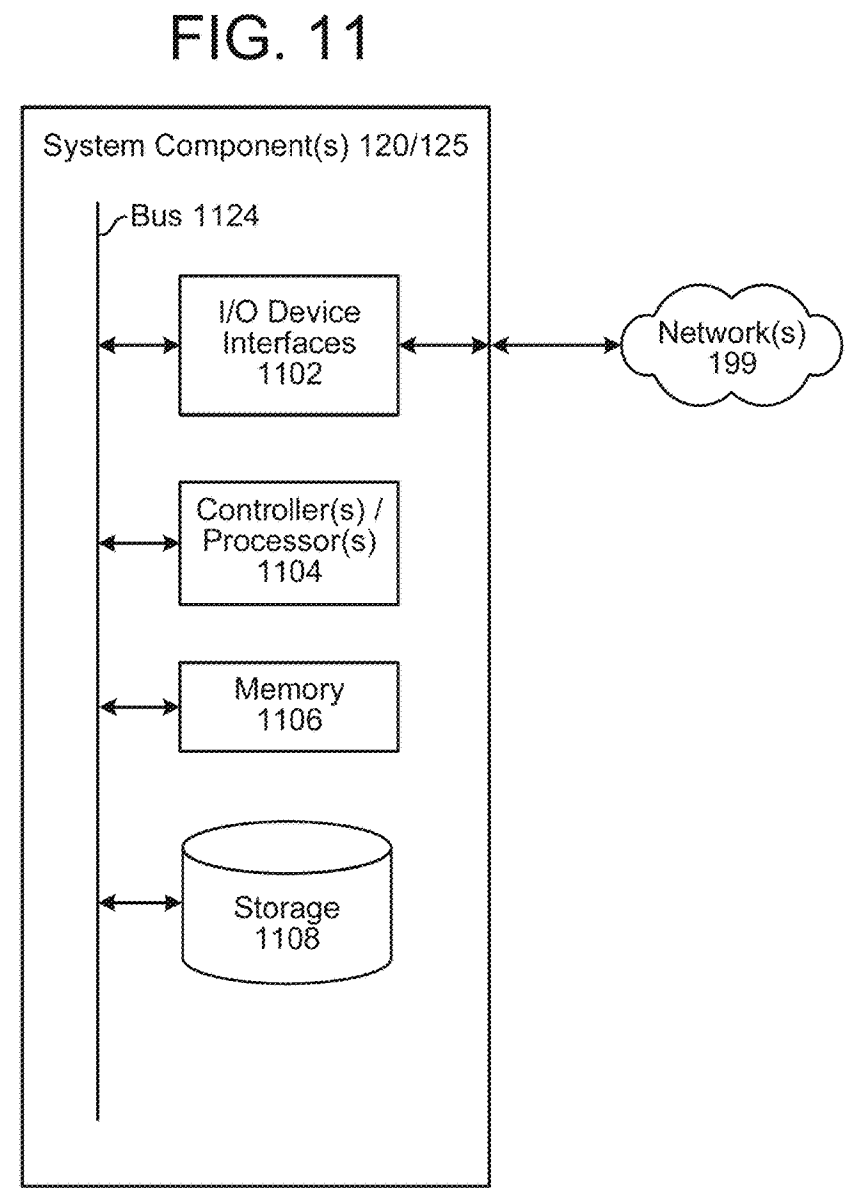

System Component(s) 120/125

Bus 1124

Network(s) 199

I/O Device Interfaces 1102

Controller(s) / Processor(s) 1104

Memory 1106

Storage 1108

EXPLANATION OF SYSTEM DETERMINATION

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1B is a conceptual diagram illustrating example processing performed by a system determination component to generate the explanation of the system determination, according to embodiments of the present disclosure.

FIG. 4 is a conceptual diagram illustrating how a supplemental content system may process data, according to embodiments of the present disclosure.

FIG. 5 is a conceptual diagram illustrating example components of a notification system, according to embodiments of the present disclosure.

FIG. 10 is a block diagram conceptually illustrating example components of a device, according to embodiments of the present disclosure.

FIG. 11 is a block diagram conceptually illustrating example components of a system, according to embodiments of the present disclosure.

DETAILED DESCRIPTION

Figure 1A:
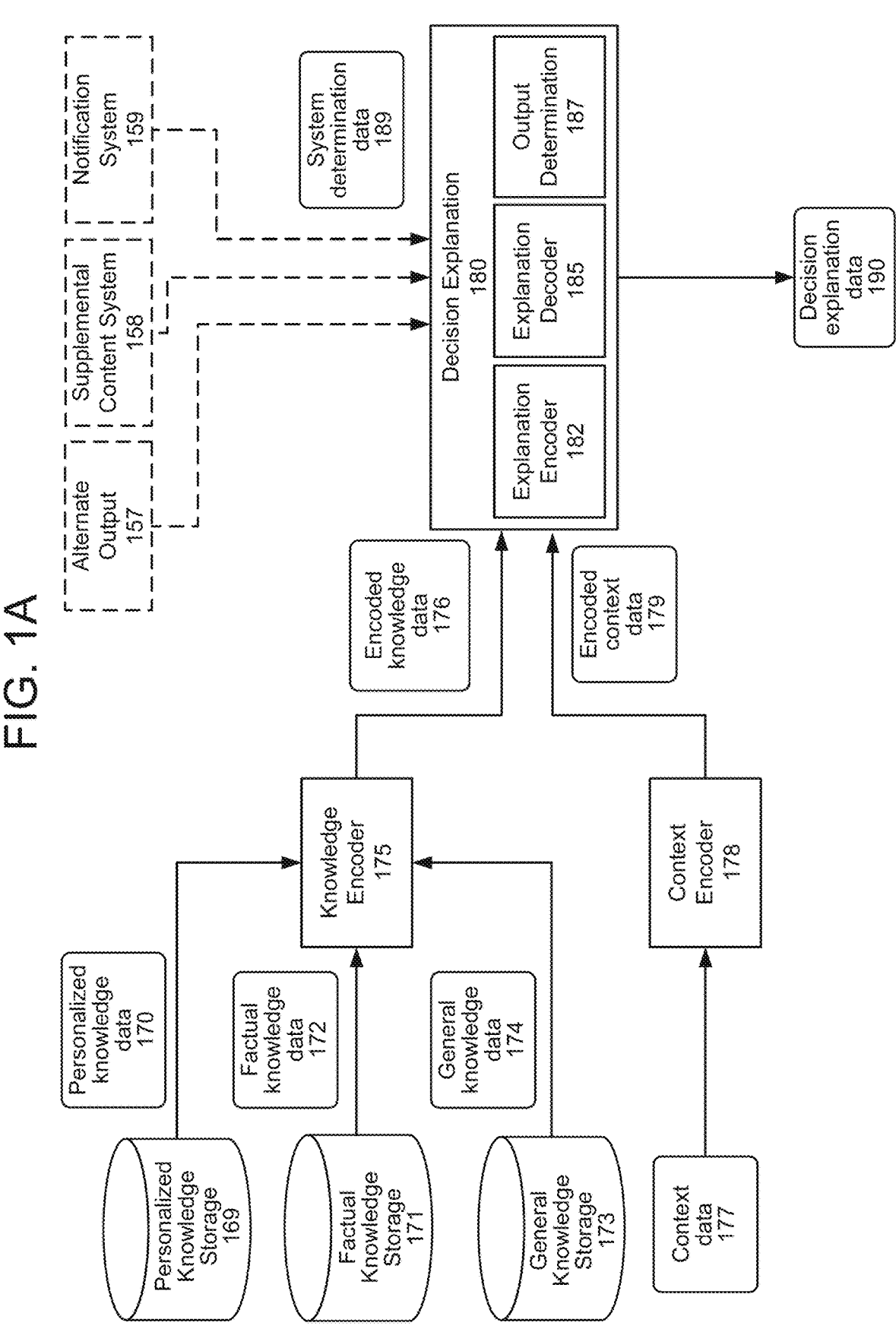
FIG. 1A is a conceptual diagram illustrating example processing performed by a system to generate an explanation of a system determination, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Natural language generation (NLG) is a field of artificial intelligence concerned with automatically transforming data into natural language (e.g., English) content. Text-to-speech (TTS) is a field of computer science concerning transforming textual and/or other data, such as that from NLG or other source of natural language, into audio data that is synthesized to resemble human speech. A notification or other supplemental content system may be used to proactively indicate and/or output content using one or more user devices associated with a user profile.

A system may be configured to generate an output responsive to a natural language (e.g., spoken or typed) user input. For example, in response to the user input "play some music," the system may output music selected by the system, for example, based on a user profile corresponding to a user who provided the user input. As another example, in response to the user input "what is today's weather," the system may output weather information for the user's geographic location and optionally inquire whether the system should output one or more news stories, for example, based on the system determining the user has previously followed such a user input with an additional user input requesting output of news stories. As another example, in response to the user input "book me a flight to Seattle," the system may book a flight to Seattle and output information of the booked flight and optionally put the booked flight information in an electronic calendar of the user. For further example, in response to the user input "lock the front door'," the system may actuate a "front door" smart lock to a locked position, for example, based on the system determining a "front door" smart lock device associated with the user profile.

A system may additionally or alternatively proactively output content to a user. For example, the system may output a notification to a user, may display content the system determines the user may be interested in, etc. For example, the system may determine a triggering event that leads to a proactive presentation of output to a user. For example, the system may determine to present visual content (e.g., an image, a video, an interactive graphical user interface (GUI) element, etc.) to the user in response to determining the content should be made available to the user, without receiving a user-provided input requesting such output.

In some instances, the system may need to make a determination in order to effectively process a user input to provide a relevant response and/or proactively output content. For example, when processing a user input, the system may generate an ASR output (e.g., a transcript of the user input), determine processing of the ASR output (e.g., NLU processing of the ASR output) will result in an error condition (e.g., some system state indicating unsatisfactory processing of data, such as NLU processing of an ASR output not satisfying a threshold confidence, where an error condition may result in a system output resulting in an unsatisfactory user experience), and based thereon may determine an alternate ASR output including a different transcript of the user input that does not result in such an error condition. For further example, when processing a user input, the system may make a determination as to which NLU intent represents the user input. As another example, when processing a user input, the system may determine supplemental content associated with, but not directly responsive to, the user input. As a further example, when processing a user input, the system may determine one or more additional actions to perform in response to the user input. For further example, the system may determine content for output to the user in response to receiving sensor data indicating detection of the presence of a user. As another example, the system may need to select, from a plurality of content, which content is to be proactively output to a user.

The present disclosure provides techniques for generating and outputting an explanation of a system determination. For example, when the system generates an alternate ASR output, the system may determine and output the natural language explanation "I thought I heard you say [first ASR output], but I think you actually said [second ASR output]." For further example, when the system determines an NLU intent representing the user input, the system may determine and output the natural language explanation "I think you are asking me to [intent included in the NLU output] because I heard you say [ASR output from which the NLU output was generated]." As another example, when the system determines supplemental content associated with, but not directly responsive to, the user input, the system may determine and output the natural language explanation "I think you may also be interested in [supplemental content] because [natural language explanation of data used to determine the supplemental content]." As a further example, when the system determines one or more additional actions to perform in response to the user input, the system may determine and output the natural language explanation "I think you may also be interested in having me [one or more additional actions] because [natural language explanation of data used to determine the one or more additional actions]." For further example, when the system determines content for output in response to receiving sensor data indicating detection of the presence of a user, the system may determine and output the natural language explanation "Based on [natural language explanation of data used to determine the content], [content]" or "[content]. I told you this because [natural language explanation of data used to determine the content]."

To determine a natural language explanation of a system determination, the system may determine an encoded representation of information stored in one or more knowledge bases (e.g., a personalized knowledge bases associated with the user, factual knowledge base, and/or a general knowledge base) and an encoded representation of contextual information (e.g., data representing the user input, environmental information (e.g., a location of the user, a location of the user's device that received the user input (e.g., in the situation where the user device receives a user input), a present time of day, weather information, etc.), information associated with the user's device (e.g., device type, device state, etc.), etc.). The system may predict a system determination that would have been made by the system in processing the user input given the information represented by the encoded knowledge base information. The system may determine whether the predicted system determination correlates to (e.g., is similar or identical to) the actual determination made by the system. If the system determines the predicted and actual determination do not correlate, the system may refrain from outputting a natural language explanation. Conversely, if the system determines the predicted and actual determination correlate, the system may output a natural language explanation corresponding to the predicted determination and/or actual determination of the system. The system may output the natural language determination as an audio and/or visual output. In some embodiments, the system may further request feedback from the user with respect to the output responsive to the user input and/or the output natural language explanation.

A system of the present disclosure may receive, from a device associated with a user profile, input audio corresponding to a spoken user input. The system may perform ASR processing using the input audio to generate a first ASR output corresponding to a first transcript of the spoken user input. The system may determine that NLU processing of the first ASR output results in an error condition. Based on this determination, the system may determine (including retrieve from memory because, in some embodiments, the initial ASR processing may produce multiple transcripts as outputs of hypotheses in a ranked order) a second ASR output corresponding to a second transcript of the spoken user input. The system may perform NLU processing using the second ASR output to generate an NLU output including an intent corresponding to the spoken user input. Using the NLU output, the system may generate first output responsive to the spoken user input. Based on determining that NLU processing of the first ASR output results in the error condition, the system may determine to present a natural language explanation of how the first output was generated. The system may determine history data associated with the user profile. The system may determine context data associated with the spoken user input. The system may process the history data and the context data to generate a second output including the natural language explanation indicating the first output was generated using the second ASR output based on determining that the NLU processing of the first ASR output results in the error condition. The system may process the history data and the context data to generate a third ASR output corresponding to a predicted transcript of the spoken user input that does not result in the error condition. The system may determine a similarity between the second ASR output and the third ASR output. Based on the similarity, the system may cause the device to present the first output in coordination with presenting the second output.

In some embodiments, the system may further process, using a first encoder, the history data to determine encoded history data. The system may process, using a second encoder, the context data to determine encoded context data. The system may process, using a decoder, the encoded history data and the encoded context data to determine the second output. The system may process, using the decoder, the encoded history data and the encoded context data to determine the third ASR output.

In some embodiments, the system may further determine second history data associated with the user profile. The system may store the second history data in a storage. The system may query the storage, using the context data, to determine the history data, where the history data corresponds to a portion of the second history data corresponding to the context data. The system may determine input data corresponding to the context data and the history data. The system may process the input data to generate the second output.

In some embodiments, the second ASR output is determined using a trained ML component, the second output is generated using a second trained ML component, and the system may further generate a third output requesting user feedback regarding the second output. The system may cause the device to present the third output. The system may receive, from the device, input data corresponding to the user feedback. Based on the user feedback, the system may determine at least one of an updated trained ML component corresponding to the trained ML component and an updated trained second ML component corresponding to the second trained ML component.

A system of the present disclosure may determine a first output using first data, where the first data is generated by a first component. Based on the first data being generated by the first component, the system may determine to present a natural language explanation of how the first output was determined. The system may determine history data associated with a user profile, the user profile being associated with the first data. Based on the history data, the system may determine a second output corresponding to the natural language explanation indicating that the first output was determined using the first data. The system may cause presentation of the first output data in coordination with presentation of the second output.

In some embodiments, the system may further determine context data associated with the first data. The system may determine the second output data further based on the context data.

In some embodiments, the system may further determine context data associated with the first data. The system may process, using a first encoder, the history data to determine encoded history data. The system may process, using a second encoder, the context data to determine encoded context data. The system may process, using a decoder, the encoded history data and the encoded context data to determine the second output data.

In some embodiments, the system may further receive third data corresponding to a user input. The system may determine a first entity included in the user input. The system may determine knowledge data associated with the first entity and a second entity, the knowledge data representing a relationship between the first entity and the second entity. The system may determine the second output based on the knowledge data.

In some embodiments, the system may further determine second history data associated with the user profile. The system may store the second history data in a storage. The system may determine context data associated with the first data. The system may query the storage, using the context data, to determine the history data, wherein the history data corresponds to a portion of the second history data corresponding to the context data. The system may determine third data including the context data and the history data. The system may determine the second output based on the third data.

In some embodiments, the system may further determine third output data using third data. The system may cause presentation of the third output. After causing presentation of the third output, the system may receive fourth data corresponding to a first user input requesting an explanation regarding why the third output was presented. The system may determine a fourth output corresponding to a second natural language explanation indicating the third output was determined using the third data. The system may cause presentation of the fourth output.

In some embodiments, the first data is determined using a first trained ML component, the second output is determined using a second trained ML component and the system may further generate a third output requesting user feedback regarding the second output; The system may cause presentation of the third output. The system may receive third data corresponding to the user feedback. Based on the user feedback, the system may determine at least one of an updated first trained ML component corresponding to the first trained ML component and an updated second trained ML component corresponding to the second trained ML component.

In some embodiments, the system may further receive input audio data corresponding to a spoken user input. The system may perform ASR processing using the input audio to generate a first ASR output corresponding to a transcript of the input audio. The system may determine that NLU processing of the first ASR output results in an error condition. Based on determining that NLU processing of the first ASR output results in the error condition, the system may determine the first data, wherein the first data corresponds to a second ASR output corresponding to a second transcript of the input audio and determining to present the natural language explanation of how the first output was determined is based on determining that NLU processing of the first ASR output results in the error condition.

Teachings of the present disclosure provide, among other things, an improved user experience as a result of informing the user as to why the system determined a particular output should be presented to the user and/or a particular action should be taken. This may allow the user to understand what information was used by the system in order to generate an output to the user. Further, by allowing the user to provide feedback with respect to the natural language explanation and/or the output determined to be responsive to the user input, the system may improve subsequent processing of one or more components of the system.

A system according to the present disclosure will ordinarily be configured to incorporate user permissions and only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A illustrates how a system may generate an explanation of a system determination. As shown in FIG. 1A, the system may include a personalized knowledge storage 169, a factual knowledge storage 171, a general knowledge storage 173, a knowledge encoder 175, a context encoder 178, an alternate output component 157, a supplemental content system 158, a notification system 159, and a decision explanation component 180. In some embodiments, as illustrated in FIG. 1A, the decision explanation component 180 may include an explanation encoder 182, an explanation decoder 185, and an output determination component 187.

The personalized knowledge storage 169 may include one or more portions of personalized knowledge data corresponding to history data associated with a user and/or a user profile associated with the user. For example, the personalized knowledge storage 169 may include one or more representations of previous user inputs, entities included in the previous user inputs, actions performed in response to the previous user inputs, notifications and/or content received by a user device and/or system component(s) that are associated with the user, sensor data indicating detection of a presence of the user, indication(s) of a state(s) of one or more devices associated with the user, etc. In some embodiments, the personalized knowledge storage 169 may include a knowledge graph representing associations between one or more of the previous user inputs, the entities included in the previous user inputs, the actions performed in response to the previous user inputs, etc.

The factual knowledge storage 171 may include one or more portions of factual knowledge data corresponding to factual information. In some embodiments, the factual information may be retrieved from an external source(s) (e.g., an encyclopedia, website, etc.) and stored in the factual knowledge storage 171, for example, in response to a user input requesting the factual information. In some embodiments, the factual knowledge storage 171 may include a knowledge graph representing associations between portions of factual information and example user inputs requesting output of the factual information.

The general knowledge storage 173 may include one or more portions of general knowledge data corresponding to logical connections between information and actions. For example, the general knowledge storage 173 may include data indicating a user may turn on a light when it is dark outside, where, in this example, turning on the light is the action and it being dark outside is the information. For further example, the general knowledge storage 173 may include data indicating a user may close a garage door when it is snowing outside, where, in this example, closing the garage door is the action and it snowing outside is the information. As another example, the general knowledge storage 173 may include data indicating a user may increase a household temperature using a thermostat when it is cold outside, where, in this example, increasing the temperature is the action and it being cold outside is the information. As a further example, the general knowledge storage 173 may include data indicating a user may turn off a light when the user leaves their home, where, in this example, turning off the light is the action and leaving the home is the information. In some embodiments, the general knowledge storage 173 may include a knowledge graph representing the logical connections between the information and the actions.

The knowledge encoder 175 may query the personalized knowledge storage 169 for personalized knowledge data 170, the factual knowledge storage 171 for factual knowledge data 172, and/or the general knowledge storage 173 for general knowledge data 174. For example, the knowledge encoder 175 may query one or more of the personalized knowledge storage 169, the factual knowledge storage 171, and the general knowledge storage 173 using a user identifier of the user (e.g., the user 105), an entity (e.g., included in the instant user input), a contextual signal (e.g., the context data 177), etc. In some embodiments, one or more of the personalized knowledge data 170, the factual knowledge data 172, and/or the general knowledge data 174 may correspond to a sub graph of the knowledge graph included in the corresponding storage. For example, in such embodiments, the sub graph may correspond to the portion of the knowledge graph that corresponds to the query made by the knowledge encoder 175.

The knowledge encoder 175 processes one or more of the personalized knowledge data 170, the factual knowledge data 172, and/or the general knowledge data 174 to generate encoded knowledge data 176. The encoded knowledge data 176 may correspond to one or more number/vector representations of one or more features (e.g., user inputs, entities, actions, user identifiers, user profile identifiers, device identifiers, factual information, logical connections, associations, etc.) of the personalized knowledge data 170, the factual knowledge data 172, and/or the general knowledge data 174. In some embodiments, the knowledge encoder 175 may generate an instance of encoded knowledge data 176 for each of the personalized knowledge data 170, the factual knowledge data 172, and/or the general knowledge data 174. In some embodiments, the knowledge encoder 175 may generate a single instance of encoded knowledge data 176 to represent two or more of the personalized knowledge data 170, the factual knowledge data 172, and/or the general knowledge data 174. The knowledge encoder 175 may send the encoded knowledge data 176 to the decision explanation component 180.

The knowledge encoder 175 may generate the encoded knowledge data 176 in order for the knowledge data to be processed by one or more downstream models (e.g., one or more ML models implemented by the decision explanation component 180) while preserving the context and relationships between one or more words and/or sentences included in the knowledge data. In some embodiments, the knowledge encoder 175 may generate the encoded knowledge data 176 using a graph neural network, shallow-embedding learning, transformers models, etc. In other embodiments, the knowledge encoder 175 may generate the encoded knowledge data 176 using post-hoc mining (e.g., embedding-based meta-path selection, node-selection based on explainable sub-graph technologies, etc.) In general, the knowledge encoder 175 may be configured to take as input the knowledge data, and may be tasked with determining a number/vector representation(s) of the knowledge data and outputting the number/vector representation(s).

In some embodiments, the knowledge encoder 175 may process one or more portions of the data included in the personalized knowledge storage 169, the factual knowledge storage 171, and/or the general knowledge storage 173 during offline processing (i.e., not during runtime processing) to generate encoded knowledge data, which may be stored in another storage of the system (e.g., the system 100). In such embodiments, at runtime, the knowledge encoder 175 may be configured to query the encoded knowledge data to determine the encoded knowledge data 176 as being a portion thereof. For example, the knowledge encoder 175 may query the storage including the encoded knowledge data using an encoded representation of a user identifier of the user (e.g., the user 105), an entity (e.g., an entity included in the instant user input), a contextual signal (e.g., the context data 275), etc. In some embodiments, the knowledge encoder 175 may query the personalized knowledge storage 169, the factual knowledge storage 171, and/or the general knowledge storage 173 based on the decision explanation component 180 receiving system determination data 189, as discussed herein below.

As shown in FIG. 1A, the context encoder 178 may receive context data 177. The context data 177 may correspond to one or more instances of contextual information (e.g., the ASR output data 145 shown in FIG. 1C, environmental information (e.g., a location of the user), a location of a user device (e.g., the user device 110 shown in FIG. 1C), a time that a user input was received, weather information, etc.), a device type of the user device (e.g., the user device 110), a state associated with the user device (e.g., the user device 110), etc.). In some embodiments, the context encoder 178 may receive the context data 177 from one or more components of the system, such as an ASR component (e.g., the ASR component 140 shown in FIG. 1C), an orchestrator component (e.g., the orchestrator component 130 shown in FIG. 1C), a context storage, etc. In other embodiments, the context encoder 178 may receive the context data 177 from a single context aggregation component configured to aggregate context data for processing by various components of the system.

The context encoder 178 processes the context data 177 to determine encoded context data 179 corresponding to a number/vector representation of one or more features (e.g., the one or more instances of contextual information) of the context data 177. The context encoder 178 may send the encoded context data 179 to the decision explanation component 180. In some embodiments, the context encoder 178 may query for/receive the content data 177 based on the decision explanation component 180 receiving system determination data 189, as discussed herein below.

The context encoder 178 may generate the encoded context data 179 in order for the context data to be processed by one or more downstream models (e.g., one or more ML models implemented by the decision explanation component 180) while preserving the context and relationships between one or more words and/or sentences included in the context data 177. In some embodiments, the context encoder 178 may generate the encoded context data 179 using a graph neural network, shallow-embedding learning, transformers models, etc. In other embodiments, the context encoder 178 may generate the encoded context data 179 using post-hoc mining (e.g., embedding-based meta-path selection, node-selection based on explainable sub-graph technologies, etc.) In general, the context encoder 178 may be configured to take as input the context data 177, and may be tasked with determining a number/vector representation of the context data 177 and outputting the number/vector representation(s).

In some embodiments, the context encoder 178 may send the context data 177 to the knowledge encoder 175. The knowledge encoder 175 may use the context data 177 to query the personalized knowledge storage 169 for the personalized knowledge data 170, the factual knowledge storage 171 for the factual knowledge data 172, and/or the general knowledge storage 173 for the general knowledge data 174 based on, for example, one or more entities represented in the context data 177.

In some embodiments, the decision explanation component 180 may take as input and process the personalized knowledge data 170, the factual knowledge data 172, the general knowledge data 174, and/or the context data 177, rather than receiving and processing encoded representations thereof.

As shown in FIG. 1A, the decision explanation component 180 may receive system determination data 189. The system determination data 189 may represent a determination made by the system during processing of a user input or during processing to determine content to be proactively output. For example, the system determination data 189 may include an ASR output including a transcript of input audio data as determined by an ASR component to represent a user input. For further example, the system determination data 189 may include an NLU output including at least an intent an NLU component determined represents a user input. As another example, the system determination data 189 may include an alternate ASR output including a transcript of input audio data as determined by an alternate output component 157, which is described in detail with respect to FIGS. 2 and 3, and may represent that the alternate output component 157 determined that NLU processing of an ASR output, generated by the ASR component, would result in an error condition For example, the error condition may result from none of the NLU outputs having a confidence score that satisfies a condition, such as a threshold confidence score, the NLU outputs being incorrect, the performance of incorrect actions by skill system components, etc. As another example, the system determination data 189 may include supplemental content associated with a user input and/or content generated in response to the user input, as determined by a supplemental content system 158 (described in detail with respect to FIG. 4), and may represent the data processed by the supplemental content system 158 in determining the supplemental content. For further example, the system determination data 189 may include a representation of one or more additional actions the system determined should be performed in response to a user input, and may represent the data the system processed to determine the one or more additional actions (e.g., history data including an indication the user has requested the performance of the additional actions in conjunction with, or in a temporal vicinity of, providing the user input). As an additional example, the system determination data 189 may include content data generated in response to a triggering event, as determined by A notification system 159 (described in detail with respect to FIGS. 5-7). In some embodiments, where the user input corresponds to image data or sensor data representing detection of a user generally or a specific user in particular, the system determination data 189 may include data the system processed to determine the content data responsive to the user input.

In some embodiments, the processing performed by one or more of the knowledge encoder 175, context encoder 178, and/or the decision explanation component 180 may be performed in response to the decision explanation component 180 receiving the system determination data 189. In other embodiments, the processing performed by one or more of the knowledge encoder 175, context encoder 178, and/or the decision explanation component 180 may be performed in response to the system receiving a user input. In further embodiments, the processing performed by one or more of the knowledge encoder 175, context encoder 178, and/or the decision explanation component 180 may be performed in response to a particular component(s) (e.g., the alternate output component 157, the supplemental content system 158, the notification system 159, an ASR component, an NLU component, etc.) generating data or data generated by the particular component(s) being used to generate data to be output/presented to a user 105. In some embodiments, the data generated by the particular component(s) may include an indicator representing it was generated by the particular component(s). In some embodiments, the system 100 may send the system determination data 189 to the decision explanation component 180. For example, the system 100 may determine to send the system determination data 189 to the decision explanation component 180 in response to determining that the system determination data 189 represents a determination made by a particular component(s) of the system 100, such as the generation of data by the particular component(s), which was used to generate an output to the user 105.

The decision explanation component 180 processes the system determination data 189 to generate decision explanation data 190. The decision explanation data 190 may represent a natural language explanation of the system determination data 189. In other words, the decision explanation data 190 may represent a natural language explanation of why the system made the determination represented in the system determination data 189 used to generate the content (e.g., the decision explanation data 190 may indicate what data was used to make the determination). For example, if the system determination data 189 represents that the system generated a rewritten ASR output corresponding to input audio data, in response to determining that processing a first ASR output corresponding to the input audio data may result in an error condition, then the decision explanation data 190 may be "I thought I heard you say [transcript included in the original ASR output], but I think you actually said [transcript included in the rewritten ASR output] because [natural language representation of the data used to generate the ASR output]." For further example, if the system determination data 189 represents an NLU output predicted by the system for some generated ASR output data, then the decision explanation data 190 may be "I interpreted you to ask me [natural language representation of the intent included in the NLU output] because [natural language representation of data used to generate the NLU output]." As another example, if the system determination data 189 represents that the system determined to output supplemental content, in addition to the content, then the decision explanation data 190 may be "I think you may also be interested in [supplemental content] because [natural language explanation of data used to determine the supplemental content]." As a further example, if the system determination data 189 represents that the system determined to perform one or more additional actions, in addition to output of the content, then the decision explanation data 190 may be "I think you may also be interested in having me [one or more additional actions] because [natural language explanation of data used to determine the one or more additional actions]." For further example, in an embodiment where the user input corresponds to sensor data (e.g., image data) representing detection of a user, if the system determination data 189 represents that the system determined the content is to be output to the detected user, then the decision explanation data 190 may be "I told [content] to you because [natural language explanation of data used to determine the content]."

Processing performed by the decision explanation component 180 to generate the decision explanation data 190 is discussed herein below with respect to FIG. 1B.

Figure 1C:
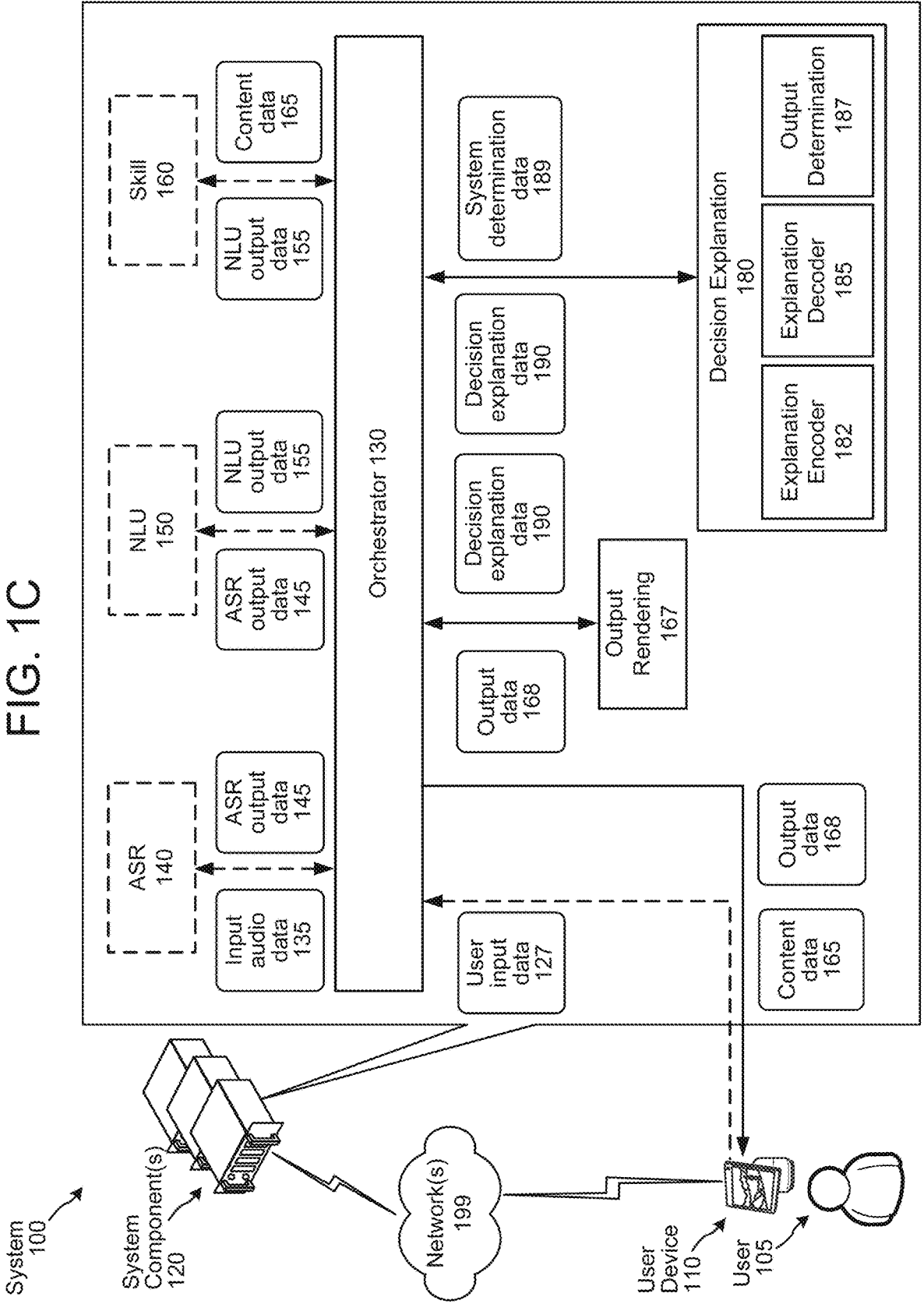
FIG. 1C is a conceptual diagram illustrating how the system determination component may process in response to a user input, according to embodiments of the present disclosure.

FIG. 1B illustrates example processing of the decision explanation component 180 to generate the decision explanation data 190. As shown in FIG. 1B, the explanation encoder 182 may receive the encoded context data 179 and/or the encoded knowledge data 176. As also shown in FIG. 1C, the decision explanation component 180 may receive the system determination data 189.

The explanation encoder 182 processes the encoded context data 179 and/or the encoded knowledge data 176 to generate encoded explanation input data 183 representing the encoded context data 179 and/or the encoded knowledge data 176. For example, the explanation encoder 182 may concatenate the encoded context data 179 and/or the encoded knowledge data 176 to generate the encoded explanation input data 183. For further example, the explanation encoder 182 may perform mean-pooling to generate the encoded explanation input data 183. As another example, the explanation encoder 182 may implement an attention-based machine learning (ML) model to generate the encoded explanation input data 183. The explanation encoder 182 may send the encoded explanation input data 183 to the explanation decoder 185.

The explanation decoder 185 processes the encoded explanation input data 183 to generate the decision explanation data 190 and prediction data 186. As discussed herein above, with respect to FIG. 1A, the decision explanation data 190 may represent a natural language explanation of the determination made by the system that resulted in generation of the content. The prediction data 186 represents a prediction made by the explanation decoder 185 of an expected determination that the system would make in order to generate content responsive to the user input. For example, the prediction data 186 may represent that the explanation decoder 185 predicted that, in generating content responsive to a user input, the system would generate an alternate output, generate supplemental content, determine to perform one or more additional actions, etc. Additionally, or alternatively, the prediction data 186 may include a particular value corresponding to the expected determination of the system. For example, if the system, in generating content responsive to a user input, determined to generate an alternate output of "please turn on the lights," then the prediction data 186 may be "please turn on the lights."

In some embodiments, the explanation decoder 185 may be configured to generate the decision explanation data 190 according to a particular template format. For example, if the explanation decoder 185 predicted that the system would generate an alternate output, the template used to generate the decision explanation data 190 may correspond to "I am not sure if I heard you correctly, I believe you said [natural language representation of the prediction data 186] because [decision explanation data 190]." For further example, if the explanation decoder 185 predicted that the system would generate supplemental content, the template used to generate the decision explanation data 190 may correspond to "I think you may also be interested in [natural language explanation of prediction data 186] because [decision explanation data 190]."

In some embodiments, the explanation decoder 185 may implement a ML model. For example, the ML model may be configured to, given the encoded explanation input data 183, predict the determination represented by the system determination data 189, and generate a natural language explanation for why the determination was made by the system. During training, the ML model may take as input encoded data representing one or more instances of contextual information (e.g., a location of a user, a location of a user device which received a user input from the user, a time that the user input was received, weather information, etc.), a device type of the user device, a state associated with the user device, etc.) and/or one or more instances of knowledge information (e.g., previous user inputs, entities included in the previous user inputs, actions performed in response to the previous user inputs, factual information, logical connections between information and actions, etc.), a training prediction label, and a training explanation label. The ML model may be tasked with generating a prediction representing a system determination that is required to be made in order to generate data responsive to the user input, and generating a natural language explanation for generating the prediction. Based on comparisons between the prediction and the natural language explanation generated by the ML model and the training prediction label and the training explanation label, respectively, the ML model may be trained accordingly. In some embodiments, such training may allow the tasks of predicting the system determination and generating the natural language explanation to be jointly learned by the ML model. In some embodiments, the decision explanation component 180 may be trained in an end-to-end manner.

The explanation decoder 185 may send the decision explanation data 190 and the prediction data 186 to the output determination component 187.

The output determination component 187 processes the decision explanation data 190 and the prediction data 186, and determines whether the decision explanation data 190 should be output to the user. In some embodiments, the output determination component 187 may make this determination based on heuristics. For example, the output determination component 187 may process the prediction data 186 to determine whether the prediction data 186 corresponds to the system determination data 189. In other words, the output determination component 187 may determine whether the system determination prediction generated by the explanation decoder 185, and used to generate the decision explanation data 190, matches the actual determination made by the system, as represented by the system determination data 189. If the output determination component 187 determines that the prediction data 186 corresponds to the system determination data 189, then the output determination component 187 may send the decision explanation data 190 for output to the user. On the other hand, if the output determination component 187 determines that the prediction data 186 does not correspond to the system determination data 189, then the output determination component 187 may cause the system to cease processing with respect to the decision explanation data 190, resulting in the natural language explanation not being output to the user. In some embodiments, the output determination component 187 may determine a score associated with the decision explanation data 190. Based on the score, the output determination component 187 may determine whether the decision explanation data 190 matches the system determination data 189. For further example, the output determination component 187 may process the decision explanation data 190 and determine whether the decision explanation data 190 includes inappropriate information (e.g., profanity, culturally insensitive language, etc.) and/or sensitive information (e.g., confidential information, financial information, medical information, etc.). If the output determination component 187 determines that the decision explanation data 190 does not include inappropriate and/or sensitive information, then the output determination component 187 may send the decision explanation data 190 for output to the user. On the other hand, if the output determination component 187 determines that the decision explanation data 190 does include inappropriate and/or sensitive information, then the output determination component 187 may cease processing with respect to the decision explanation data 190, resulting in the natural language explanation not being output to the user. In some embodiments, the output determination component 187 may determine a score associated with the decision explanation data 190. Based on the score, the output determination component 187 may determine whether the decision explanation data 190 includes inappropriate and/or sensitive information.

Additionally, or alternatively, the output determination component 187 may determine whether the decision explanation data 190 should be sent for output to the user using an ML model. For example, the ML model may take as input the encoded explanation input data 183 and the decision explanation data 190, and may be configured to generate a new instance of decision explanation data 190 and/or determine whether the decision explanation data 190 should be used. In some embodiments, the ML model may be trained similar to the ML model implemented by the explanation decoder 185. In some embodiments, the ML model may implement a back-propagation based Explainable Artificial Intelligence (XAI) approach to determine the encoded explanation input data 183 (e.g., DeepLIFT, Integrated Gradients, etc.)

Additionally, or alternatively, the output determination component 187 may determine whether the decision explanation data 190 should be sent for output to the user based on feedback provided by the user. For example, the system may be configured to output a request for feedback from a user with respect to the natural language explanation and/or content output to the user. The output determination component 187 may subsequently use such feedback to determine whether subsequently generated decision explanation data 190 should be output. The output determination component 187 may compare the natural language decision explanation data associated with the feedback to the decision explanation data 190. For example, if the feedback represented a positive user experience, and the natural language decision explanation data associated with the feedback matches the decision explanation data 190, then the output determination component 187 may determine the decision explanation data 190 should be sent for output to the user. On the other hand, if the feedback represented a negative user experience, and the natural language decision explanation data associated with the feedback matches the decision explanation data 190, then the output determination component 187 may determine the decision explanation data 190 should not be sent for output to the user.

In some embodiments, the output determination component 187 may be configured to further determine and compare the encoded explanation input data, associated with the natural language decision explanation data associated with the feedback, to the encoded explanation input data 183 associated with the decision explanation data 190 to determine whether the feedback is relevant for the decision explanation data 190. For example, the natural language decision explanation input data may be associated with a decision explanation identifier, which is associated with the encoded explanation input data used to generate the natural language decision explanation data. The output determination component 187 may receive the decision explanation identifier from the orchestrator along with the feedback.

In some embodiments, the feedback from the user may be used to retrain one or more of the models implemented by the decision explanation component 180. For example, based on whether the feedback from the user is positive or negative, one or more parameters of one or more models implemented by the decision explanation component 180 may be modified.

FIG. 1C illustrates a system 100 for generating an explanation of a system determination. The system 100 may include the user device 110, local to the user 105, in communication with the system component(s) 120 via a network(s) 199. The network(s) 199 may include the Internet and/or any other wide- or local-area network, and may include wired, wireless, and/or cellular network hardware.

The system component(s) 120 may include various components. With reference to FIG. C, the system component(s) 120 may include the orchestrator component 130, the ASR component 140, the NLU component 150, a skill component 160, an output rendering component 167, and the decision explanation component 180. However, the present disclosure is not intended to be limited to such a configuration. In some embodiments, the user device 110 may include or otherwise be configured to perform the herein disclosed processing of one or more of the orchestrator component 130, the ASR component 140, the NLU component 150, the skill component 160, the output rendering component 167, and the decision explanation component 180. As discussed above, in some embodiments, the decision explanation component 180 may include the explanation encoder 182, the explanation decoder 185, and the output determination component 187.

As illustrated in FIG. 1C, in some embodiments, the user device 110 may receive a user input, and send user input data 127 corresponding thereto to the system component(s) 120. As discussed above, the user input may request performance of an action and/or output of information. For example, the user input may be "how old is [entity name]," "lock the front door," "book me a train ticket to [location]," "play [song name] by [artist name]," "what is today's weather," or some other natural language user input. In some situations, the user input may request an explanation as to why the system 100 provided a previous output. For example, the user input may be "what made you say that," "why did you show that to me," "what made you decide to do that," or another like natural language user input.

The user input data 127 may include various types of data. For example, the user input data 127 may include input audio data when the user input is a spoken natural language input received by one or more microphones of or associated with the user device 110. For further example, the user input data may include input text data when the user input is a typed natural language user input. In some embodiments, the user input data may include one or more other types of data, such as data representing actuation of a physical button, data representing selection of a button displayed on a graphical user interface (GUI), image data of a gesture performed by the user 105, sensor data representing detection of a user generally or the user 105 in particular, etc.

The system component(s) 120 may receive the user input data 127 at the orchestrator component 130. The orchestrator component 130 may facilitate processing performed by various components of the system component(s) 120. For example, the orchestrator component 130 may facilitate the processing of and response to a user input.

In the situation where the user input data 127 is or includes input audio data 135, the orchestrator component 130 may send the input audio data 135 to the ASR component 140. In the situation where the user input data 127 is or includes other types of data (e.g., data representing actuation of a physical button, data representing selection of a button displayed on a GUI, image data, sensor data, etc.), the system component(s) 120 may send the user input data 127 to one or more components configured to process the received data to generate therefrom a text (or tokenized) representation of the user input that is capable of being processed by the NLU component 150. For example, if the user input data 127 is or includes data representing selection of a GUI-displayed button, then the orchestrator component 130 may send the user input data 127 to one or more "GUI user input" components of the system component(s) 120. For further example, if the user input data 127 is or includes image data of a user gesture, then the orchestrator component 130 may send the image data to a gesture detection component, of the system component(s) 120, which may determine the performed gesture corresponds to a particular user input In the situation where the user input data 127 is or includes input audio data 135 and the orchestrator component 130 sends the input audio data 135 to the ASR component 140. The ASR component 140 processes the input audio data 135 to generate ASR output data 145 including a text or tokenized transcript of the spoken natural language input of the input audio data 135. In some embodiments, the ASR output data 145 may include one or more ASR outputs, where each ASR output includes a text or tokenized transcript of the spoken natural language input of input audio data 135. Processing of the ASR component 140 is described in detail herein below in connection with FIG. 8. The ASR component 140 may send the ASR output data 145 to the orchestrator component 130, and the orchestrator may send the ASR output data 145 to the NLU component 150.

In situations where the user input data 127 is or includes data other than the input audio data 135, and a component(s) of the system component(s) 120 processes to generate text or tokenized data representing the user input data 127, the orchestrator component 130 may send this text or tokenized data to the NLU component 150. In situations where the user input data 127 is or includes input text data of a typed natural language user input, the orchestrator component 130 may send the input text data to the NLU component 150.

The NLU component 150 processes the ASR output data 145 or other received text or tokenized data representing the user input, and generates NLU output data 155 including one or more NLU outputs, where each NLU output indicates at least an intent (e.g., including an intent indicator) representing the user input. In some situations, an NLU output may also indicate one or more entity types represented in the user input, along with corresponding entity values (e.g., a "city" entity type corresponding to the entity value "Seattle"). Processing of the NLU component 150 is described in detail herein below in connection with FIG. 8. The NLU component 150 may send the NLU output data 155 to the orchestrator component 130.

The orchestrator component 130 may send the NLU output data 155 to a skill component 160 to generate content data 165 responsive to the user input. In some embodiments, the system component(s) 120 may implement more than one skill component, where the skill component are configured to perform different processing. In such embodiments, the system component(s) 120 may include a post-NLU ranker that determines which particular skill component (i.e., the skill component 160) is to process to generate the content data 165 responsive to the instant user input. The skill component 160 may generate the content data 165 based on the NLU output data 155, and potentially other data, and may send the content data 165 to the orchestrator component 130. In some embodiments, the decision explanation component 180 may be implemented as a skill component, such that the post-NLU ranker may determine that the decision explanation component 180 is to process to generate content data responsive to a user input. For example, in response to the user input "Why did you show me that," the system 100 may process such that the post-NLU ranker determines that the decision explanation component 180 is to generate content data responsive to the user input, such as "I presented [previous content data] to you based on [data used to generate the previous content data]."

The content data 165 may include image data, video data, and/or audio data (e.g., including synthesized speech) for output to the user 105. Techniques for generating the content data 165 using the skill component 160 are described in detail herein below with respect to FIG. 10. In some embodiments, the skill component 160 may output text or tokenized data corresponding to a natural language output responsive to the user input, and a TTS component 1080 (illustrated in FIG. 8) may generate output audio data including synthesized speech corresponding to the natural language output.

Thereafter, the orchestrator component 130 may cause the content data 165 to be sent to the user device 110, and/or another user device associated with the same profile data (e.g., user profile data, group profile data, etc.) as the user device 110, to be output to the user 105. For example, the content data 165 may include image and/or video data to be displayed to the user 105, the user device 110 may not include a display, and the other user device may be or include a display useable to display the image and/or video data.

The orchestrator component 130 may also send system determination data 189 to the decision explanation component 180. In some embodiments, the orchestrator component 130 may send the system determination data 189 prior or at least partially in parallel to causing the content data 165 to be sent to the user device 110.

As discussed above, the decision explanation component 180 processes the system determination data 189 to generate decision explanation data 190. The decision explanation data 190 may represent a natural language explanation of the system determination data 189. In other words, the decision explanation data 190 may represent a natural language explanation of why the system 100 made the determination represented in the system determination data 189 used to generate the content data 165 (e.g., the decision explanation data 190 may indicate what data was used to make the determination). The decision explanation component may send the decision explanation data 190 to the orchestrator component 130.

The orchestrator component 130 may send the decision explanation data 190 to the output rendering component 167 to generate output data 168 corresponding thereto. The output rendering component 167 may be any component configured to generate output data from the decision explanation data 190. For example, the output rendering component 167 may include or be a TTS component (e.g., the TTS component 680 illustrated in and described with respect to FIG. 6 below). That is, the output rendering component 167 may be configured to generate output audio data including synthesized speech corresponding to the decision explanation component. For further example, the output rendering component 167 may include or be a component configured to generate visual output data (e.g., output image and/or video data) corresponding to the decision explanation data 190. As another example, the output rendering component 167 may include or be a component configured to generate interactive content (e.g., a graphical user interface (GUI) button(s)) corresponding to the decision explanation data 190, which is to be presented to the user 105. For example, the output rendering component 167 may generate a GUI including text corresponding to the decision explanation data as well as two GUI buttons, one indicating the explanation was helpful and one indicating the explanation was not helpful. In such a situation, the user may select one of the GUI buttons to provide feedback as to the usefulness of the decision explanation.

In situations where the output rendering component 167 is or includes a TTS component, the TTS component may process the decision explanation data 190 to generate output audio data (i.e., an example of the output data 168) including synthesized speech corresponding to the decision explanation data 190. The output rendering component 167 may send the output audio data to the orchestrator component 130, and the orchestrator component 130 may send the output audio data to the user device 110 for presentation to the user 105.

In some situations, the orchestrator component 130 may cause the decision explanation data 190 to be presented as visual content (e.g., an image or video). In such situations, the output rendering component 167 may generate output visual data (i.e., an example of the output data 168) corresponding to the decision explanation data 190, and the orchestrator component 130 may send the output visual data to the user device 110 with an instruction to display the visual data.

In some situations, the orchestrator component 130 may cause the decision explanation data 190 to be presented as audio as well as visual content. In such situations, the output rendering component 167 may generate output multimedia data (i.e., an example of the output data 168) including the aforementioned output audio data and the aforementioned output visual data, and the orchestrator component 130 may send the output multimedia data to the user device 110 with an instruction to present same.

As discussed above, with respect to FIG. 1B, in some embodiments, a request for feedback may be output to the user 105 along with the output data 168. Or the output data may include the request for feedback. For example, the request for feedback may be output audio data and/or output visual data (e.g., one or more GUI button's, text, an image, and/or a video). The user 105 may provide the feedback via an additional user input (e.g., a spoken input, a natural language input, a touch input, a gesture input, etc.). the user feedback may be used to retrain one or more parameters of the decision explanation component 180 and/or the component(s) used to make the system determination with respect to which the user feedback was provided.

In the situation where the user input corresponds to a request to output an explanation of a previous system-generated output, and after sending the NLU output data to the orchestrator component 130, the orchestrator component 130 may be configured to determine dialog history data associated with a current dialog between the user 105 and the system.

As used herein, a "dialog" may refer to data transmissions (such as relating to multiple user inputs and system outputs) between the system and a user (e.g., through one or more user devices) that all relate to a single "conversation" between the system and the user. Thus, the data transmissions of a dialog may be associated with a same dialog identifier, which may be used by components of the system to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system to request a food delivery in a spoken utterance and the system may respond by displaying images of food available for order and the user may then speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog. In some embodiments, the system determination data determined during a dialog, as well as knowledge data (e.g., personalized knowledge data, the factual knowledge data, and/or the general knowledge data) and context data may be associated with the dialog identifier.

The orchestrator component 130 may determine and send the system determination data associated with the previous output to which the user input is related, the knowledge data, and the context data to the decision explanation component 180 to process as described herein above to generate natural language decision explanation data. The orchestrator component 130 may cause output of the natural language decision explanation data as described herein above.

In some embodiments, the decision explanation component 180 may be configured to generate natural language decision explanation data for each response generated by the system 100, and store the natural language decision explanation data in association with a user identifier associated with the corresponding user and/or device identifier associated with the corresponding user device. In such embodiments, in response to receiving a user input requesting output of a previous system-generated output, the system 100 may retrieve the natural language decision explanation data for the previous system-generated output, and cause the natural language decision explanation data to be output to the user 105.

Figure 2:
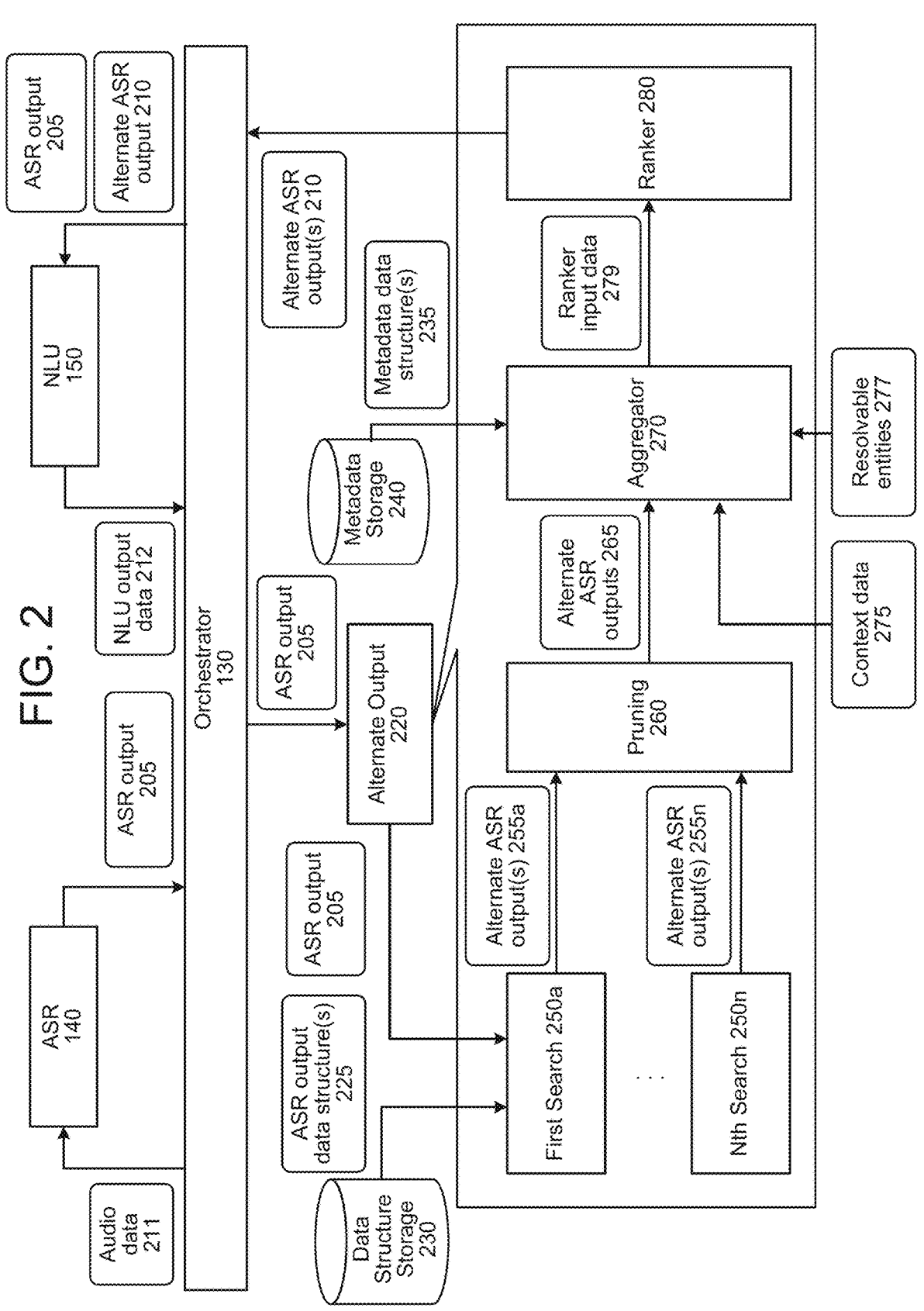
FIG. 2 is a conceptual diagram illustrating how a spoken natural language input may be processed at runtime using an automatic speech recognition (ASR) component, an alternate output component, and a natural language understanding (NLU) component, according to embodiments of the present disclosure.

FIG. 2 conceptually illustrates how a spoken natural language input may be processed at runtime. After the orchestrator component 130 receives the audio data 211 corresponding to a spoken natural language input, the orchestrator component 130 may send the audio data 211 to the ASR component 140. The ASR component 140 may transcribe the audio data 211 into one or more ASR outputs, and output one or more of the ASR outputs to the orchestrator component 130. For illustration, FIG. 2 shows the ASR component 140 sending a single ASR output 205 to the orchestrator component 130.

The orchestrator component 130 may send the ASR output 205 to the alternate output component 220. The alternate output component 220 may process the ASR output 205 to determine a rephrase of the ASR output 205. In at least some embodiments, the orchestrator component 130 may send, to the alternate output component 220, each ASR output the orchestrator component 130 receives from the ASR component 140. Alternatively, the orchestrator component 130 may send, to the alternate output component 220, only a subset of the ASR outputs the orchestrator component 130 receives from the ASR component 140. For example, the orchestrator component 130 may only send, to the alternate output component 220, ASR outputs associated with ASR processing confidence scores that fail to satisfy a threshold ASR processing confidence score. Such may limit the processing of the alternate output component 220 with respect to only ASR outputs that may result in an error condition (e.g., the generation of incorrect NLU outputs, the performance of incorrect actions by skill system component(s) 125, etc.).

The alternate output component 220 may implement one or more different data search techniques to determine alternate ASR outputs. For example, the alternate output component 220 may process the ASR output 205 with respect to a data structure (described in further detail herein) to determine an alternate ASR output that corresponds to the ASR output 205 but that is similar to a previous rephrase of the ASR output 205 that resulted in a skill system component(s) 125 performing a correct action. The alternate output component 220 outputs an alternate ASR output(s) 210.

In at least some embodiments, the orchestrator component 130 may send the alternate ASR output(s) 210, but not the ASR output 205, to the NLU component 150. In at least some other embodiments, the orchestrator component 130 may send the alternate ASR output(s) 210 and the ASR output 205 to the NLU component 150. In at least some other embodiments, the orchestrator component 130 may send the ASR output 205, but not the alternate ASR output(s) 210, to the NLU component 150 (e.g., in the situation where the orchestrator component 130 determines the alternate ASR output(s) 210 is associated with a score(s) that fails to satisfy a threshold score, thereby representing the system component(s) 120 is not confident enough that the alternate ASR output(s) 210 is a correct rephrase of the NLU output data 155). The NLU component 150 may process with respect to the ASR output 205 and/or the alternate ASR output(s) 210. As described above, the NLU component 150 may rank NLU outputs generated thereby. One skilled in the art will thus appreciated that, when the NLU component 150 processes with respect to both the ASR output 205 and the alternate ASR output(s) 210, respective NLU outputs may be generated, and the NLU component 150 may select a best of the generated NLU outputs for further processing.

The NLU component 150 sends the NLU results data 212 to the orchestrator component 130. While not illustrated in FIG. 2, the orchestrator component 130 may send a NLU output to an appropriate skill system component(s) 125 for processing and execution of a corresponding action.

In situations where data structures are implemented, the alternate output component 220 may output a NLU output(s). In at least some examples, an alternate ASR output may be generated from an NLU output generated by the alternate output component 220. The alternate ASR output may then be processed by a recognizer of the NLU component 150 to generate a second NLU output. If NLU models (used to generate the NLU model in the data structure) are the same as the NLU models used to generate the second NLU output, the NLU output (output by the alternate output component 220) and the second NLU output may be the same. Conversely, if NLU models (used to generate the NLU model in the data structure) are different from the NLU models used to generate the second NLU output (e.g., due to an update in the NLU models), the NLU output (output by the alternate output component 220) and the second NLU output may be different.

Figure 3:
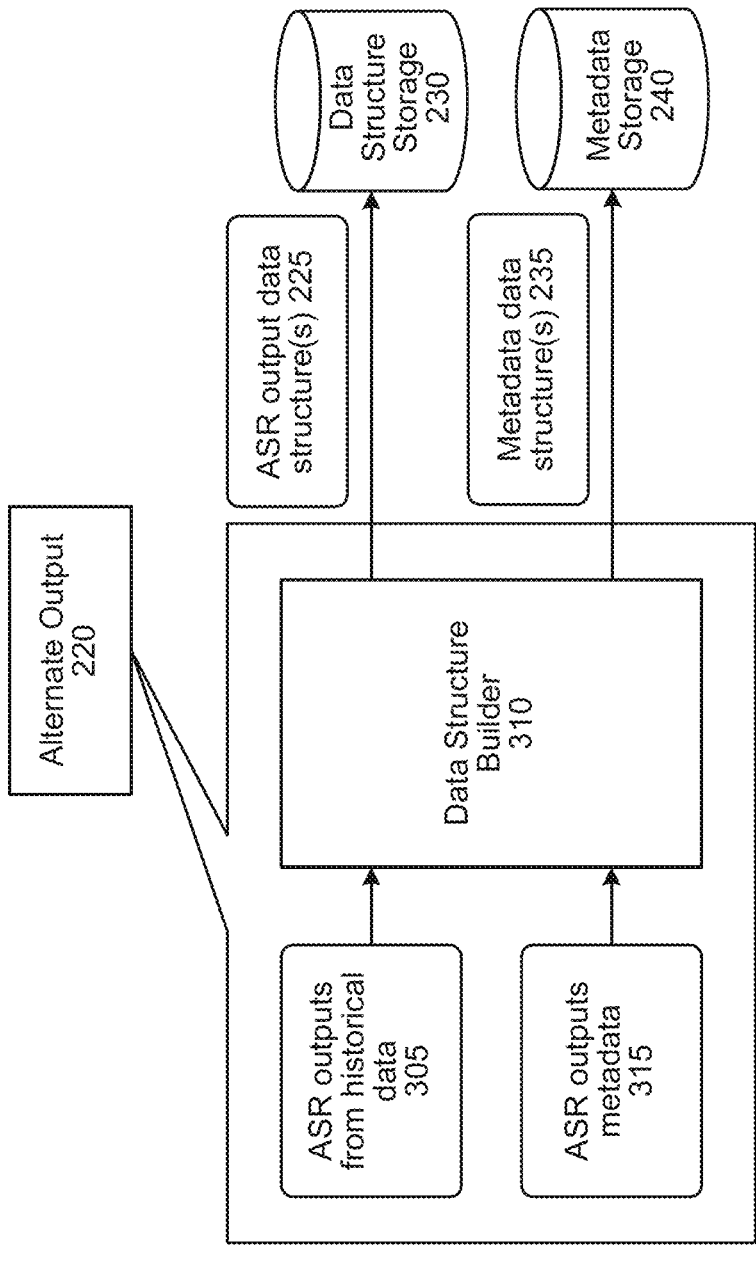
FIG. 3 is a conceptual diagram illustrating how the alternate output component may generate one or more data structures for use at runtime to determine alternate ASR outputs, according to embodiments of the present disclosure.

With reference to FIG. 3, described is how the alternate output component 220 may generate one or more data structures for use at runtime to determine alternate ASR output. The system component(s) 120 may store historical data corresponding to previous natural language inputs that failed (e.g., resulted in an ASR output associated with an ASR confidence score that did not satisfy a threshold ASR confidence score, a NLU output associated with a NLU confidence score that did not satisfy a threshold NLU confidence score, a skill system component(s) 120 performing an incorrect action, etc.) and were corrected via user input. For example, after the system component(s) 120 outputs data in response to a natural language input, a user may provide the system component(s) 120 with one or more subsequent natural language inputs that indicate the output data was wrong (and that optionally provide clarity as to what the correct output would have been). In at least some embodiments, a subsequent natural language input may correspond to a user-provided rephrase of the original natural language input, with the rephrased natural language input being a system-understandable natural language input (e.g., one that results in an ASR output associated with an ASR confidence score that satisfies a threshold ASR confidence score, a NLU output associated with a NLU confidence score that satisfies a threshold NLU confidence score, a skill system component(s) 120 performing a correct action, etc.).

The ASR output 305 may include ASR output, corresponding to failed natural language inputs, associated with respective correctly rephrased ASR output. Thus, ASR output 305 may, in at least some embodiments, include pairings of ASR output, with each pairing including a ASR output, corresponding to a failed natural language input, and a corresponding correctly rephrased ASR output.

The data structure builder 310 may generate one or more ASR output data structures 225. The data structure builder 310 may send the ASR output data structure(s) 225 to the data structure storage 230.

The data structure builder 310 may implement one or more machine learned models to generate one or more ASR output data structures 225. The model(s) run by the data structure builder 310 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component, such as the data structure builder 310, requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

An ASR output data structure 225 may include ASR output (associated with failed natural language inputs) associated with correct rephrases of the ASR outputs. In at least some embodiments, an ASR output data structure 225 may be configured as a mapping of ASR output (associated with failed natural language inputs) and corresponding correct rephrases of the ASR output.

The data structure builder 310 may generate more than one ASR output data structure 225. As described herein, the alternate output component 220 use more than one data search technique to determine alternate output. In at least some embodiments, the data structure builder 310 may generate a different ASR output data structure for each data search technique implemented by the alternate output component 220. For example, the data structure builder 310 may generate a first ASR output data structure that may be traversed using Lucene searching, may generate a second ASR output data structure that may be traversed using deep neural network (DNN) searching, may generate a third ASR output data structure that may be traversed using convolutional neural network (CNN) searching, may generate a fourth ASR output data structure that may be traversed using elastic searching, etc. Techniques for generating data structures for traversal using different data search techniques are known to one skilled in the art.

In at least some embodiments, the data structure builder 310 may use negative samples to generate at least a portion of an ASR output data structure 225. A negative sample may refer to an alternate ASR output that is purposely rephrased incorrectly by the data structure builder 310. For example, the data structure builder 310 may generate an alternate ASR output by replacing a song name, artist name, or other word(s) in a correct alternate ASR output with a word(s) that is known to be an incorrect rephrase of a corresponding ASR output.

The data structure builder 310 may also receive ASR output metadata 315 corresponding to the received ASR output 305. The metadata 315, associated with a single ASR output 305, may represent various context data including, for example, a time of day when the natural language input (corresponding to the ASR output 305) was received, a location of the user device 110 that captured the natural language input, input/output capabilities of the user device 110 that captured the natural language input, a user identifier corresponding to the user that provided the natural language input, a state of a dialog when the natural language input was received, etc.

The data structure builder 310 may receive different metadata, associated with a single ASR output (corresponding to a failed natural language input), from multiple sources. The data structure builder 310 may generate a metadata data structure(s) 235 wherein various metadata (received from multiple sources) is associated with an appropriate ASR output. The data structure builder 310 may send the metadata structure(s) 235 to a metadata storage 240.

With reference once more to FIG. 2, the alternate output component 220 may receive the ASR output 205 from the ASR component 140 (or a top-scoring ASR output 205 in the situation where the ASR component 140 outputs multiple ASR output). In the alternate output component 220, the ASR output 205 may be sent to various search components (250-250n). The various search components 250 may generally be configured for recall purposes (i.e., to determine as many relevant alternate ASR output as possible.

Various different types of search components 250 may be implemented with respect to the ASR output 205. Illustrative, non-limiting examples of search components that may be implemented include a DNN search component, a CNN search component, a Lucene search component, an elastic search component, and a long short-term memory (LSTM) search component. One skilled in the art will appreciate that running various different search components (implementing different search techniques) enables better alternate ASR output recall (e.g., enables determination of more possible alternate ASR output) than running a single search technique.

A search component 250 may receive a corresponding ASR output data structure 225 from the data structure storage 230. For example, a DNN search component may receive, from the data structure storage 230, an ASR output data structure capable of being searched using a DNN model. For further example, a CNN search component may receive, from the data structure storage 230, an ASR output data structure capable of being searched using a CNN model. In another example, a Lucene search component may receive, from the data structure storage 230, an ASR output data structure capable of being searched using a Lucene model. In a further example, an elastic search component may receive, from the data structure storage 230, an ASR output data structure capable of being searched using an elastic search model. In another example, a LSTM search component may receive, from the data structure storage 230, an ASR output data structure capable of being searched using a LSTM model.

A search component 250 may be configured to find, in a respective ASR output data structure received from the data structure storage 230, one or more paths (from the ASR output 205 to an associated alternate ASR output) having the highest likelihood of success (e.g., having a highest similarity score).

Each search component 250 may output one or more alternate ASR outputs 255. In at least some embodiments, a search component 250 may output any alternate ASR output with respect to which the search component 250 generates a similarity score satisfying a threshold similarity score. In at least some embodiments, a search component 250 may output a maximum number of different alternate ASR output.

The alternate ASR outputs 255, output from the search components (250a-250n) may be input to a pruning component 260. The pruning component 260 is configured to reduce the number of alternate ASR outputs 255 processed by downstream components of the alternate output component 220.

In at least some embodiments, the pruning component 260 may delete redundant alternate ASR outputs 255 received by the pruning component 260. Accordingly, alternate ASR output 265, output by the pruning component 260, may include only one instance of any particular alternate ASR output.

In at least some embodiments, the pruning component 260 may additionally or alternatively prune received alternate ASR outputs 255 based on similarity score. For example, the pruning component 260 may output alternate ASR outputs 265 associated with similarity scores satisfying a threshold similarity score.

In at least some embodiments, the pruning component 260 may additionally or alternatively prune received alternate ASR outputs 255 based on a number of alternate ASR output. For example, the pruning component 260 output up to a threshold number of alternate ASR outputs 265.

The alternate ASR outputs 265, output by the pruning component 260, may be input to an aggregator component 270. The aggregator component 270 may aggregate the alternate ASR outputs 265, metadata, context data 275, and entities 277 that are resolvable by a entity resolution component of the NLU component 150.

The aggregator component 270 may receive a user identifier output from the user recognition component 1095 (or a top-ranked user identifier output from the user recognition component 1095 in the situation where the user recognition component 1095 outputs multiple user identifiers). For each alternate ASR output 265, the aggregator component 270 may query the metadata storage 240 for a metadata data structure 235 representing context data associated with the alternate ASR output 265 and the user identifier. As such, a metadata data structure 235 (received by the aggregator component 270 for a certain alternate ASR output 265) may represent one or more previous instances when the system component(s) 120 either received a spoken natural language input interpreted by the ASR component 140 to be represented by the alternate ASR output 265, or previously correctly rephrased an ASR output to the alternate ASR output 265. The context data, represented in a metadata data structure 235 received by the aggregator component 270, may include context data such as, for example, a time of day when a natural language input (corresponding to the alternate ASR output 265) was received, a location of the user device 110 that captured the natural language input, input/output capabilities of the user device 110 that captured the natural language input, a state of a dialog when the natural language input was received, etc.

The context data 275 may represent various context data associated with the ASR output 205 input to the alternate output component 220. The context data 275 may include context data such as, for example, a time of day when a natural language input (corresponding to the ASR output 205) was received, a location of the user device 110 that captured the natural language input, input/output capabilities of the user device 110 that captured the natural language input, a state of a dialog when the natural language input was received, etc.

The resolvable entities 277 may include entities known to the system component(s) 120. The resolvable entities 277 may correspond to different domains. For example, the resolvable entities 277 may include artist names, song titles, album names, etc. corresponding to a music domain. For further example, the resolvable entities 277 may include movie titles, actor names, etc. corresponding to a video domain. In at least some embodiments, the resolvable entities 277 may be limited to entities represented in previous natural language inputs associated with the user identifier associated with the ASR output 205 (e.g., a user identifier output by the user recognition component 1095 with respect to the present natural language input).

The aggregator component 270 may, in addition to aggregating the various data described above, perform processing on the data to put the data in a format processable by a ranker component 280 of the alternate output component 220 (illustrated as ranker input data 279). The ranker input data 279 may include aggregator component 270-generated representations of the various data. For example, the aggregator component 270 may output the ASR output 205, alternate ASR output 265, metadata, context data 275, and entities 277 that are resolvable by the entity resolution component of the NLU component 150.

As described above, in some embodiments, the system 100 may determine to output supplemental content, in addition to the content data 165. In such embodiments, after determining the content data 165, the orchestrator component 130 may send the content data 165 to a supplemental content system (e.g., the supplemental content system 400) of the system 100. The supplemental content system 400 is configured to determine when supplemental content is to be presented to the user 105. The supplemental content system 400 is illustrated in FIG. 4.

Figure 4:
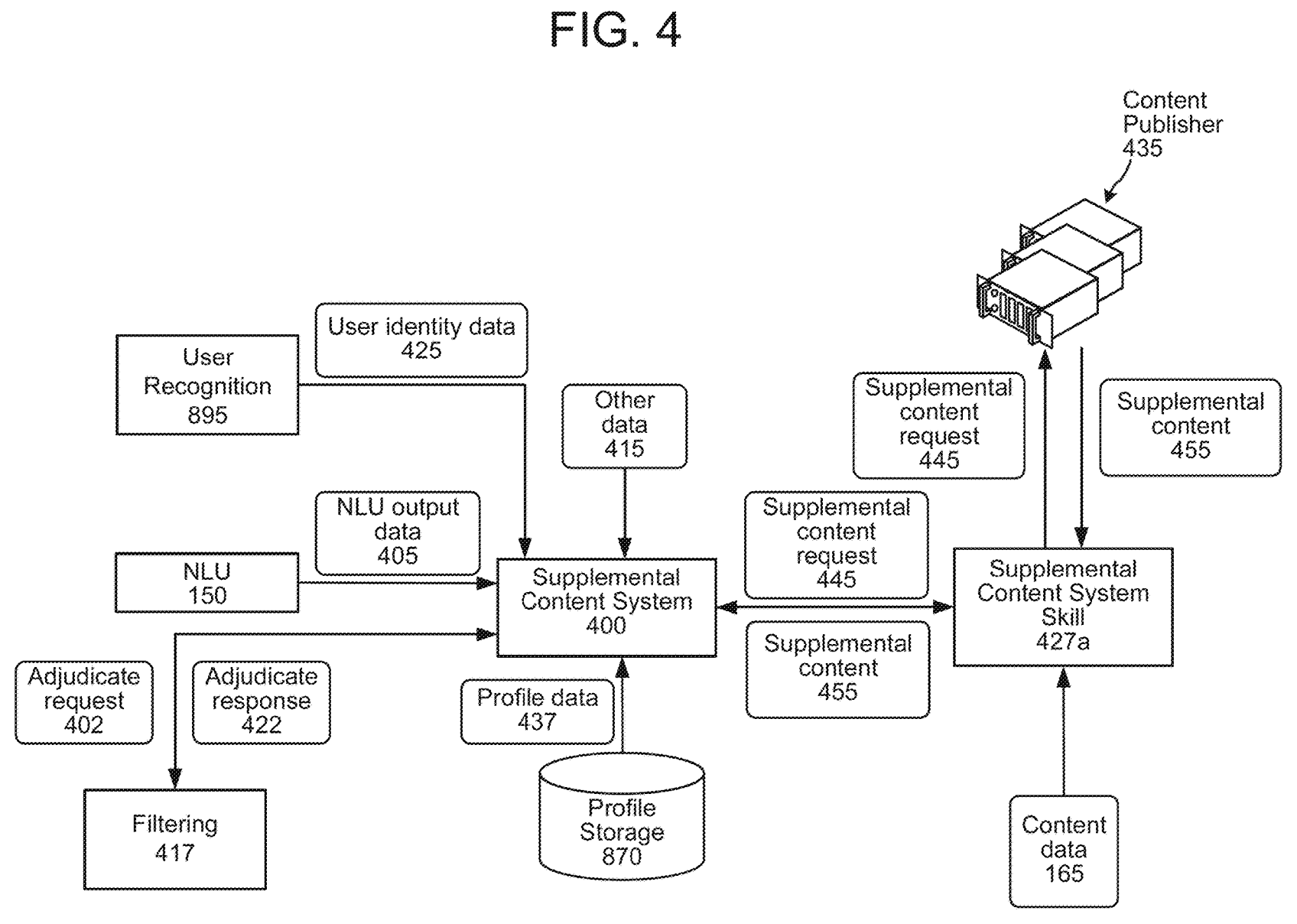

FIG. 4 illustrates how the supplemental content system 400 may determine inferred content associated with but not directly responsive to a user input as well as determine whether the inferred content should be output to a user. Each time a NLU component 150 (described herein with respect to FIGS. 1C and 4) outputs NLU output data 405, the NLU output data 405 may be input to the supplemental content system 400. The supplemental content system 400 determines whether inferred content associated with but not directly responsive to the user input should be output.

The supplemental content system 400 may base its determinations at least in part on non-user specific data, such as skill-provided data, system generated intent pairs, etc.

The supplemental content system 400 may determine whether inferred content should be output based on data accompanying output data provided to the system component(s) 120 by a skill component 1090. Such data may be represented as other data 415. In addition to providing the system component(s) 120 with output data responsive to a user input, the skill component 1090 may provide the system component(s) 120 with presentation framework data. The presentation framework data may include information indicating the types of content (e.g., audio, image, video, etc.) represented in the output data as well as one or more devices associated with the user 105 that should be used to output the different types of output data. The presentation framework data may, in some instances, also include information indicating the system component(s) 120 should determine inferred content associated with the output data, but which is not directly responsive to the user input. When the presentation framework data includes such information, the supplemental content system 400 may determine inferred content may be output.

The supplemental content system 400 may also determine whether inferred content should be output based on data provided to the system component(s) 120 by a skill component 1090, with the data not accompanying output data. Such data is represented as other data 415. A skill component 1090 may provide the system component(s) 120 with data indicating that any time the NLU output data 405 indicates a particular intent, the supplemental content system 400 should solicit the skill component 1090 as to whether the skill component 1090 has inferred content that may be output. For example, a concert ticket skill may provide the system component(s) 120 with data indicating that anytime the NLU output data 405 indicates a <Play-Music> intent, the supplemental content system 400 should solicit the concert ticket skill as to whether the concert ticket skill has access to information indicating a concert put on by a resolved artist entity represented in the NLU output data 405. For further example, an electronic calendar skill may provide the system component(s) 120 with data indicating that anytime the NLU output data 405 indicates an <OutputTime> intent, the supplemental content system 400 should solicit the electronic calendar skill as to whether the electronic calendar skill has calendar entries associated with an electronic calendar associated with the user device 110 and/or user 105. Yet further, for example, a traffic report skill may provide the system component(s) 120 with data indicating that anytime the NLU output data 405 indicates a <BookRide> intent, the supplemental content system 400 should solicit the traffic report skill to provide current traffic report information.

The supplemental content system 400 may also determine whether inferred content should be output based on the intent represented in the NLU output data 405. The system component(s) 120 may store intent pair data (illustrated as other data 415) corresponding to pairs of intents. Each pair of intents may be associated with a respective score representing a likelihood that a second intent of the pair will be invoked by a user within a time threshold subsequent to content responsive to the first intent being output. The scores of various intent pairs may be normalized. The intent pair data may be untailored with respect to any given user of the system component(s) 120. For example, the intent pair data may include the following intent pairs with corresponding scores:

<GetWeather>; <GetTraffic>
<OrderPizza>; <PlayMovie>
<PlayMusic>; <SetVolume>

The intent pair data may be configured based solely upon the natures of the intents. For example, a pair of intents may include a <PlayMusic> intent and a <Change Volume> intent. The pair of intents may be associated with a score representing a likelihood that a user may input a first user input corresponding to the <PlayMusic> intent immediately prior to the user inputting a second user input corresponding to the <ChangeVolume> intent based solely on the <PlayMusic> intent and the <ChangeVolume> intent both relating to output of audio from the system component(s) 120. For further example, a pair of intents may include a <BookPlaneTicket> intent and a <GetWeather> intent. This pair of intents may be associated with a score indicating a likelihood that users who by plane tickets often ask about the weather for their destination.

Intents may also be paired based on system usage history associated with various different users. Pairing of the intents may be skill agnostic. Thus, both the first intent and the second intent of a pair of intents may be associated with a single skill, or the first intent of the pair may be associated with a first skill while the second intent of the pair may be associated with a second skill. For example, a pair of intents may include a <PlayMusic> intent and a <Change Volume> intent, where both the <PlayMucic> intent and the <Change Volume> intent correspond to a music skill. For further example, a pair of intents may include a <BookPlaneTicket> intent and a <GetWeather> intent, where the <BookPlaneTicket> intent corresponds to a booking skill and the <GetWeather> intent corresponds to a weather skill. Pairing of the intents may also be agnostic with respect to the 1P or 3P nature of the skills associated with the intents. That is, both of the intents of a pair may be associated with one or more 1P skills implemented by the system component(s) 120/user device 110, both of the intents of a pair may be associated with one or more 3P skills in communication with the system component(s) 120/user device 110, or a first intent of a pair may be associated with a 1P skill while the second intent of the pair is associated with a 3P skill. For example, a pair of intents may include a <PlayMusic> intent and a <ChangeVolume> intent, where both the <PlayMusic> intent and the <Change Volume> intent are executed by a 1P skill. For further example, a pair of intents may include a <PlayMusic> intent and a <Change Volume> intent, where both the <PlayMusic> intent and the <Change Volume> intent are executed by a 3P music skill. For further example, a pair of intents may include a <BookPlaneTicket> intent and a <PlayMusic> intent, where the <BookPlaneTicket> intent is executed by a 3P skill and the <PlayMusic> intent is executed by a 1P skill.

The intent pair data may alternatively be user-specific. For example, if a user routinely invokes a <Change Volume> intent subsequent to a <PlayMusic> intent, the system component(s) 120 may increase the score associated with a pair of intents corresponding to these intents. Conversely, if the user rarely invokes the <ChangeVolume> intent subsequent to the <PlayMusic> intent, the system component(s) 120 may decrease the score associated with a pair of intents correspond to these intents.

The supplemental content system 400 may also base its determinations at least in part on present user input originating user-specific data. Each user may have a different tolerance regarding how many times inferred content is output in a given period of time, what kinds of inferred content are output, as well as how inferred content is presented.

The supplemental content system 400 may receive user identity data 425 from the user recognition component 895. The user identity data 425 may indicate the present user input originating user 105 (e.g., include a user identifier of the user 105).

If the supplemental content system 400 determines inferred content (an example of supplemental content) should be output, the supplemental content system 400 generates an inferred content request 445, and sends same to a supplemental content system skill 427a configured to determine inferred content associated with but not directly responsive to the current user input. The inferred content request 445 may include at least a portion of the NLU output data 405, and optionally at least a portion of the profile data 437 and/or at least a portion of the other data 415.

The inferred content request 445 may indicate a specific skill that should be solicited for inferred content. As described above, a skill may provide the system component(s) 120 with data indicating that any time NLU output data indicates a particular intent, the supplemental content system 400 should solicit the skill as to whether the skill has inferred content that may be output. When the supplemental content system 400 determines the NLU output data 405 indicates the particular intent, the inferred content request 445 may include an indication that the supplemental content system skill 427a should solicit the specific skill for inferred content associated with one or more resolved entities represented in the NLU output data 405.

The supplemental content system skill 427a may determine a skill from which to receive inferred content from based on the NLU output data 405. For example, the supplemental content system skill 427a may determine the NLU output data 405 includes a <PlayMusic> intent and a resolved artist of "Adele." Based thereon, the supplemental content system skill 427a may determine a concert booking skill from which to receive inferred content from.

The supplemental content system skill 427a may send the inferred content request 445 to one or more content publisher 435. A content publisher 435 may provide the supplemental content system skill 427a with inferred content 455 associated with but not directly responsive to the user input. The supplemental content system skill 427a then sends the inferred content 455 to the supplemental content system 400.

In some instances, the orchestrator component 130 may provide the content data 165 to the supplemental content system skill 427a. The supplemental content system skill 427a may then send the content data 165 (as the inferred content 455) to the supplemental content system 400.

In response to receiving the inferred content 455, the supplemental content system 400 may send the adjudicate request 402, corresponding to the inferred content 455, to the filtering component 417. The filtering component 417 may then process as described herein to generate adjudicate response data 422 for the inferred content 455. If the adjudicate response data 422 indicates the inferred content 455 may be output, the supplemental content system 400 may, in response to receiving the adjudicate response data 422, output the inferred content 455 to the user 105 via the user device 110. The inferred content 455 may be output as synthesized speech, displayed text, etc.

In some instances, more than one content publisher 435 may send inferred content to the supplemental content system skill 427a, and the supplemental content system skill 427a may send the multiple instances of inferred content to the supplemental content system 400. In such instances, the supplemental content system 400 may send an adjudicate request for each inferred content to the filtering component 417, and the filtering component 417 may generate an adjudicate response for each adjudicate request. The supplemental content system 400 may then rank which single inferred content, of the various instances of inferred content, should be output based at least in part on the adjudicate responses.

In some embodiments, the supplemental content system 400 may send a batch adjudicate request, indicating various instances of inferred content, to the filtering component 417. In such embodiments, the filtering component 417 may generate a single adjudicate response representing decisions of an evaluation component for the different instances of inferred content, and the supplemental content system 400 may rank which single inferred content to output based at least in part on the single adjudicate response.

In some instances, a content publisher 435 may be unable to determine inferred content, and the content publisher 435 may provide the supplemental content system skill 427a with an indication of such.

In some embodiments, the processing performed by the system 100 to generate and output decision explanation data may be performed in response to determining that content corresponding to an event is to be proactively presented to the user 105, rather than in response to a user input. For example, a notification system 500 may include an event bus configured to determine and store content data to be presented to the user 105, in response to a delivery management component determining that the content data should be made available to the user 105. In such embodiments, the system 100 may be configured to generate and output decision explanation data representing a natural language explanation of the system determination resulting in the determination and output of the content data. The system 100 may further be configured to request feedback from the user 105 with respect to the output and/or the output natural language explanation. In some embodiments, the notification system 500 may be included in the system component(s) 120 and/or the user device 110. In other embodiments, the notification system 500 may be in communication with the system component(s) 120 and/or the user device 110 via the network(s) 199. Further details of an illustrative notification system are described herein below in connection with FIGS. 5-7.

As shown in FIG. 5, the notification system 500 may include a topic management component 505, a subscription component 510, a delivery preference component 515, a VUI/GUI subscription and preference management component 520, a delivery management component 525, a content rendering component 530, an event bus 535, an expiry tracking component 540, and/or other components.

The topic management component 505 may include a repository of content topics supported by the notification system 500. Example content topics include, but are not limited to, meeting start time, new email, sporting event update, weather update, taxi arrival, product delivery, media recommendation (e.g., music, movies, television shows, news, etc.), and media (e.g., television) start time.

The topic management component 505 may also include a repository of schemas for content topics. A schema may define the structure data is to take for a particular content topic. For example, a schema may indicate data, corresponding to a particular content topic as received from a content publisher 435, is to include supplemental content and one or more particular types of metadata (e.g., an identifier of the content publisher, whether the supplemental content is requested or inferred, a topic of the supplemental content, how the content publisher prefers the supplemental content be indicated to a user(s), how the content publisher prefers the supplemental content be output to a user(s), a validity duration of the supplemental content, etc.). In some embodiments, each schema may be associated with only one content topic, and each content topic may be associated with only one schema. In other embodiments, a schema may be associated with more than one content topic and/or a content topic may be associated with more than one schema.

The topic management component 505 may include one or more APIs. The topic management component 505 may include one or more APIs for content publishers 435 to get a schema. For example, the topic management component 505 may be configured such that each schema is associated with a respective, different API. The topic management component 505 may also include one or more APIs that enable the topic management component 505 to fetch the one or more topics supported by a content publisher 435.

The subscription component 510 may manage all requested supplemental content subscriptions. The subscription component 510 may communicate with a subscription storage (not illustrated) containing all requested supplemental content subscriptions. The subscription component 510 may implement one or more APIs that enable users to subscribe to receive particular supplemental content topics. In some embodiments, the one or more APIs may include one or more Create, Read, Update, and Delete (CRUD) APIs.

When a user/group of users subscribes to receive a content topic, the subscription component 510 may associate, in the subscription storage, a user/group identifier, of the user/group of users, with a content topic indicator corresponding to the content topic. In some situations, the user/group of users may subscribe to receive a content topic from one or more particular content publishers 435. In such situations, the subscription component 510 may associate, in the subscription storage, the user/group identifier with the content topic indicator and each identifier of each of the one or more content publishers 435. The data, in the subscription storage, enables user/group identifier-based retrieval of requested content subscriptions.

The delivery preference component 515 may manage all requested content delivery preferences. The delivery preference component 515 may communicate with a requested content delivery preference storage (not illustrated) containing all requested content delivery preferences. The delivery preference component 515 may implement one or more APIs that enable users to indicate preferences for receiving requested content (e.g., activation of a light indicator, display of a banner, a time when requested content can be or should not be output, etc.). In some embodiments, the one or more APIs may include one or more CRUD APIs.

In some instances, a user/group of users may indicate a delivery preference(s) with respect to a particular content topic. In such instances, the delivery preference component 515 may associate, in the requested content delivery preference storage, a user/group identifier, of the user/group of users, with a content topic indicator, corresponding to the content topic, and data representing the delivery preference(s). In some situations, the user/group of users may indicate a delivery preference(s) with respect to a content topic and one or more particular content publishers 435. In such situations, the delivery preference component 515 may associate, in the requested content delivery preference storage, the user/group identifier with the content topic indicator, each identifier of each of the one or more content publishers 435, and data representing the delivery preference(s). The data, in the requested content delivery preference storage, enables user/group identifier-based retrieval of requested content delivery preferences.

The VUI/GUI subscription and preference management component 520 may be configured to authenticate incoming user inputs that originate from a companion application. A companion application is one that may be installed on a handheld user device 110 (e.g., a smart phone or tablet) and that enables the handheld user device 110 to communicate with the system component(s) 120 and the notification system 500. An example of a companion application is the Amazon Alexa application that may be installed on handheld devices.

The VUI/GUI subscription and preference management component 520 may include one or more APIs. In some embodiments, the one or more APIs may include one or more external proxy representation state transfer (REST) APIs that enable authentication of user inputs. In some embodiments, the one or more APIs may include a backend proxy API.

The delivery management component 525 manages the runtime delivery of content (i.e., determines how content should be indicated to a user). The delivery management component 525 may include one or more APIs to manage runtime delivery of content. In some embodiments, the one or more APIs may include one or more CRUD APIs. For example, when the notification system 500 receives supplemental content for a user, the delivery management component 525 may be called to determine how the supplemental content should be indicated to the user. Such determination may be based on various considerations.

In some embodiments, the delivery management component 525 may determine supplemental content should be indicated only if the corresponding content publisher 435 has registered with the notification system 500 to provide supplemental content to users. In some embodiments, the delivery management component 525 may determine supplemental content should be indicated only if the corresponding content publisher 435 has registered with the notification system 500 to provide supplemental content of the particular content topic of the supplemental content. In some embodiments, the delivery management component 525 may determine supplemental content should be indicated only if one or more devices of the intended recipient are not in a "do not disturb" mode (i.e., device identifiers of the one or more devices are not associated with do not disturb indicators/flags).

The delivery management component 525 may also determine preferences for how supplemental content should be indicated to the intended recipient. For example, the delivery management component 525 may determine a preference(s) of the content publisher 435 and/or the intended recipient. In some embodiments, the preference(s) of the content publisher 435 may be determined from the metadata associated with the received supplemental content. In some embodiments, the preference(s) of the intended recipient may be determined from a subscription(s) of the intended recipient. A preference(s) may indicate an output type for indicating the supplemental content (e.g., activation of a light indicator, display of a GUI element, vibration of a device, etc.) and/or when (e.g., time of day, day of week, etc.) the supplemental content may be indicated.

The delivery management component 525 may determine an output type(s) for indicating supplemental content. The delivery management component 525 may determine the output type(s) based on a preference(s) of a content publisher, a preference(s) of the intended recipient, and/or characteristics/components of one or more user devices 110 of the intended recipient.

The content rendering component 530 is configured to generate read-time supplemental content. The content rendering component 530 may generate read-time supplemental content using one or more templates, using a serial peripheral interface (SPI) callback, or determining pre-configured supplemental content (e.g., requested content may be pre-configured). When generating the read-time supplemental content, the content rendering component 530 may validate that the generated supplemental content includes valid speech synthesis markup language (SSML).

The event bus 535 may allow content publishers 435 and other devices to publish events to the notification system 500. The event bus 535 may also allow other systems to subscribe to receive events published to the event bus 535 by components of the notification system 500.

The expiry tracking component 540 is configured to determine when supplemental content is expiring, and causing the supplemental content to be indicated and/or proactively output to an intended user.

Figure 6:
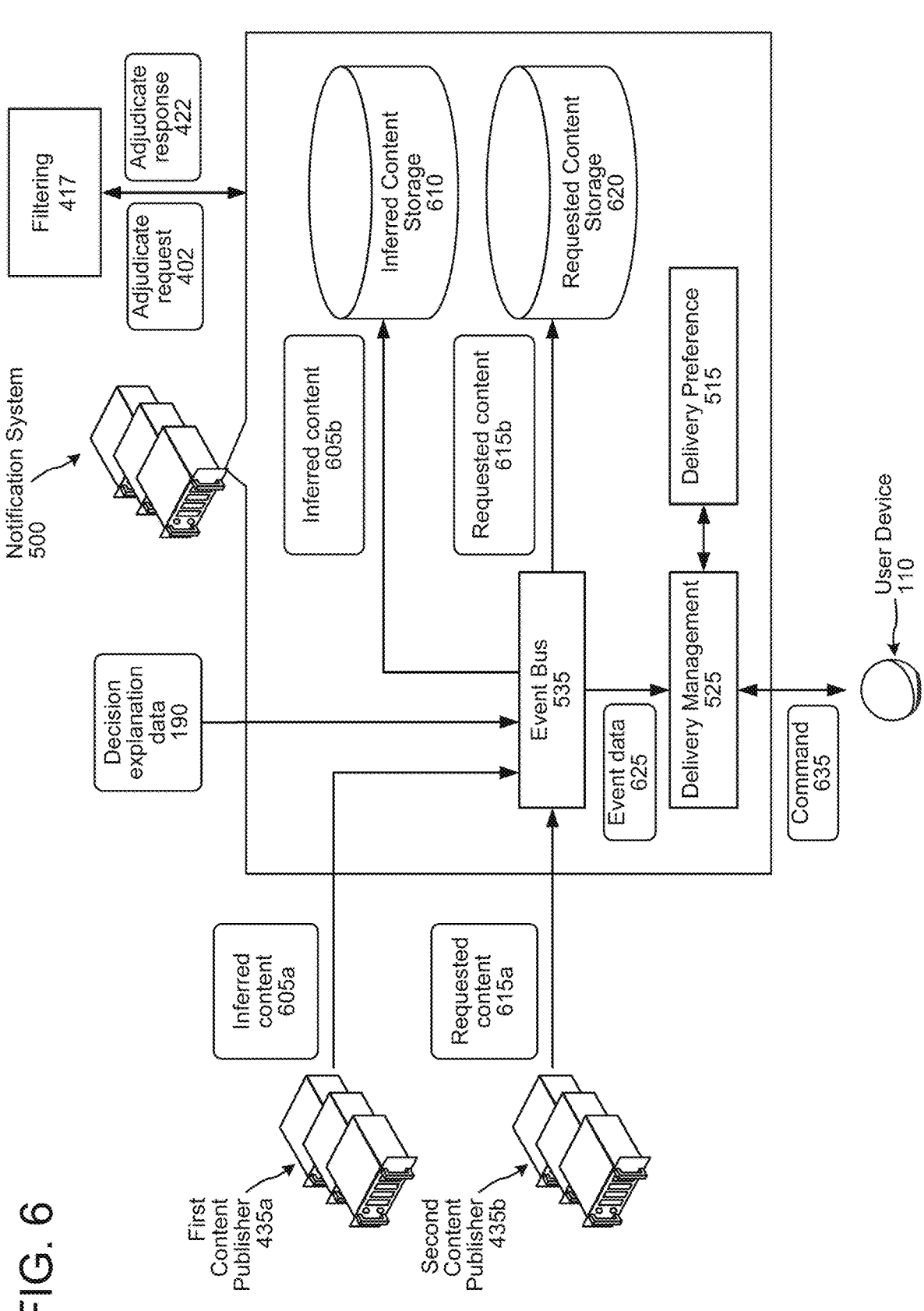
FIG. 6 is a conceptual diagram of components for indicating supplemental content using the notification system, according to embodiments of the present disclosure.

Referring now to FIG. 6, it is described how the notification system 500 may receive supplemental content and indicate same. A first content publisher 435a may send inferred content 605a to the event bus 535 of the notification system 500. In some embodiments, the inferred content 605a may be in a structured, tagged, non-natural language format. In other words, the inferred content 605a may not be in a format suitable for output to an intended user and/or group of users. For example, the inferred content 605a may include "NotificationTopic: Shopping Recommendation; Product: [product description]; Price: [product price]," representing a product having a specific price is available for purchase. For further example, the inferred content 605a may include "NotificationTopic: Feature/Functionality Recommendation; Feature/Functionality: [feature/functionality description]," representing a computing feature/functionality is available for use.

In some embodiments, the inferred content 605a may be in natural language. For example, the inferred content 605a may be "[product description] is available for purchase at [price], would you like me to order it for you?" For further example, the inferred content 605a may be "[feature/functionality description], would you like to enable?"

The inferred content 605a may be accompanied by (i.e., associated with) metadata. In some embodiments, the metadata may include a single user identifier corresponding to a single user to receive the inferred content 605a. For example, the inferred content 605a may recommend a user purchase a product based on the product being included in the user's electronic "wishlist" and/or based on a purchase history of the user. For further example, the inferred content 605a may recommend a feature/functionality of the system component(s) 120/user device 110/skill component 160 to a user that has used another feature/functionality of the system component(s) 120/user device 110/skill component 160 within a past amount of time (e.g., within a past day, week, month, etc.). In the foregoing examples, the metadata may include the user identifier of the particular user to receive the inferred content 605a.

In some embodiments, the metadata may include a group identifier corresponding to a group of users to receive the inferred content 605a. For example, the inferred content 605a may recommend a user group purchase a product based on the product being included in the user group's electronic "wishlist" and/or based on a purchase history of the user group. For further example, the inferred content 605a may recommend a feature/functionality of the system component(s) 120/user device 110/skill component 160 to a user group that has used another feature/functionality of the system component(s) 120/user device 110/skill component 160 within a past amount of time (e.g., within a past day, week, month, etc.). In the foregoing examples, the metadata may include the group identifier of the user group to receive the inferred content 605a.

In some embodiments, the metadata may include a user identifier(s) and/or group identifier(s) stored in the profile storage 870. In at least some embodiments, the metadata may include an encoded user identifier corresponding to a user identifier stored in the profile storage 870. In some embodiments, the metadata may include an encoded group identifier corresponding to a group identifier stored in the profile storage 870. In some embodiments, to maintain user privacy, the first content publisher 435a may not have access to a user identifier and/or group identifier stored in the profile storage 870. In these embodiments, the metadata may include an identifier that uniquely corresponds to a particular user identifier and/or group identifier stored in the profile storage 870.

In some embodiments, the metadata may include a parameter for identifying one or more users to receive the inferred content 605a. For example, the inferred content 605a may recommend a feature/functionality of the system component(s) 120/user device 110/skill component 160 to users that have used another feature/functionality of the system component(s) 120/user device 110/skill component 160 within a past amount of time (e.g., within a past day, week, month, etc.). In this example, the metadata may include the parameter of "used [feature/functionality description] within [past amount of time]."

In some embodiments, the metadata may include multiple user and/or group identifiers corresponding to multiple users and/or user groups to receive the inferred content 605a.

In some embodiments, the metadata may indicate a validity duration of the inferred content 605a. In other words, the metadata may indicate an amount of time (e.g., minutes, hours, days, etc.) that the inferred content 605a is valid for. In other embodiments, the first content publisher 435a may indicate a validity duration of a content topic when the first content publisher 435a registers with the notification system 500 to provide supplemental content to users thereof. In such embodiments, the metadata may include a content topic (e.g., product recommendation, feature/functionality recommendation, etc.), and the notification system 500 may determine the content topic in the metadata, determine the inferred content 605a and metadata was received from the first content publisher 435a, and, based on the foregoing, determine a validity duration of the inferred content 605a.

In some embodiments, the metadata may indicate an output type the first content publisher 435a recommends be used to output the inferred content 605a. For example, the metadata may indicate the inferred content 605a should be output as synthesized speech. For further example, the metadata may indicate the inferred content 605a should be output using a display. As another example, the metadata may indicate the inferred content 605*a* should be output both as synthesized speech and using a display. In a further example, the metadata may indicate the inferred content 605*a* may be output either as synthesized speech or using a display.

In some embodiments, the metadata may include a first content publisher identifier corresponding to the first content publisher 435*a*.

In some embodiments, the first content publisher 435*a* may send the inferred content 605*a* and associated metadata to the event bus 535 via an API.

The event bus 535 may communicate with an inferred content storage 610. The inferred content storage 610 may be implemented by the notification system 500. When the metadata, associated with the inferred content 605*a*, includes a user identifier, the inferred content storage 610 may store an association between inferred content 605*b* (corresponding to the inferred content 605*a*), the user identifier, and the metadata. When the metadata, associated with the inferred content 605*a*, includes a group identifier, the inferred content storage 610 may store an association between the inferred content 605*b*, the group identifier, and the metadata. Additionally or alternatively, when the metadata, associated with the inferred content 605*a*, includes a group identifier, the notification system 500 may determine one or more user identifiers associated with the group identifier, and the inferred content storage 610 may store an association between the inferred content 605*b*, the metadata, and each of the one or more user identifier associated with the group identifier. When the metadata, associated with the inferred content 605*a*, includes a parameter for identifying one of more users, the notification system 500 may determine one or more user identifiers and/or one or more group identifiers corresponding to the parameter (e.g., having a usage history, user demographic information, etc. corresponding to the parameter), and the inferred content storage 610 may store an association between the inferred content 605*a*, the metadata, and each of the one or more user identifiers and/or group identifiers corresponding to the parameter.

In some situations, the inferred content storage 610 may store more than one inferred content associated with a single user or group identifier at a point in time. In some embodiments, the notification system 500 may be configured to determine a score (e.g., confidence score, probability score, etc.) representing inferred content should in fact be output to a user. The inferred content storage 610 may associate inferred content with its respective score such that the inferred contents associated with a single user or group identifier may effectively be ranked within the inferred content storage 610 according to priority of output.

In some embodiments, the inferred content 605*b* may be a copy of the inferred content 605*a*. For example, the inferred contents 605*a*/605*b* may both be a structured, non-natural language formatted inferred content.

In some embodiments, the notification system 500 may receive the inferred content 605*a* in a structured, non-natural language form, but the inferred content storage 610 may store the inferred content 605*b* in a natural language form. In some embodiments, the notification system 500 may use a template-based approach to generate the natural language formatted inferred content 605*b*. A template may include natural language with portions (e.g., variables) to be populated with information from the structured, non-natural language inferred content 605*a*. A template may be associated with a content publisher 435. A template may additionally or alternatively be associated with a content topic. In some embodiments, the notification system 500 may perform one or more art-known/industry-known natural language generation techniques using the structured, non-natural language inferred content 605*a* to generate the corresponding natural language inferred content 605*b*.

In some embodiments, upon receiving the inferred content 605*a* and associated metadata, the notification system 500 may send an adjudicate request 402, corresponding to the inferred content 605*a*, to the filtering component 417. The filtering component 417 may then process as described herein to generate adjudicate response data 422 for the inferred content 605*a*. If the adjudicate response data 422 indicates the inferred content 605*a* may be output, the notification system 500 may, in response to receiving the adjudicate response data 422, store the inferred content 605*b* and associated data in the inferred content storage 610. Conversely, if the adjudicate response data 422 indicates the inferred content 605*a* should not be output, the notification system 500 may, in response to receiving the adjudicate response data 422, prevent the inferred content 605*a* and associated data from being stored in the inferred content storage 610.

In some embodiments, inferred content may not be output until a user receives requested content as well. In such embodiments, the storage of the inferred content 605*b* (and associated metadata) in the inferred content storage 610 may not, in and of itself, cause other processing of the notification system 500 to be commenced.

Sometime after receiving and storing the inferred content 605*a*/605*b*, a second content publisher 435*b* may send requested content 615*a* to the event bus 535. While FIG. 6 illustrates first and second content publishers 435*a*/435*b*, it will be appreciated that the same content publisher may send both the inferred content 605*a* and the requested content 615*a* to the event bus 535.

In some embodiments, the requested content 615*a* may be in a structured, tagged, non-natural language format. In other words, the requested content 615*a* may not be in a format suitable for output to an intended user and/or group of users. For example, the requested content 615*a* may include "NotificationTopic: Meeting; Participant: John; Time: 15 minutes," representing a meeting with John is starting in 15 minutes. For further example, the requested content 615*a* may include "NotificationTopic: Email; SenderName: Jane; Time: 2 minutes," representing an email was received from Jane 2 minutes ago. In another example, the requested content 615*a* may include "NotificationTopic: GameUpdate; SportsTeamName: Seahawks; Time: 30 minutes," representing a Seahawks game is starting in 30 minutes. For further example, the requested content 615*a* may include "NotificationTopic: Weather Update; Weather: Rain; Time: 45 minutes," representing it will start raining in about 45 minutes. In another example, the requested content 615*a* may include "NotificationTopic: Taxi Update; TaxiServiceName: Bob's; ArrivalTime: 3 minutes; Vehicle: Red sedan; LicensePlate: ABCD1234; PickupLocation: 123 First Street," representing a red sedan, having license plate ABCD1234, from Bob's taxi service will be arriving in about 3 minutes at 123 First Street. For further example, the requested content 615*a* may include "NotificationTopic: Delivery Update; Product: Dish soap; Delivery Time: 45 minutes," representing ordered dish soap is expected to be delivered in about 45 minutes. In another example, the requested content 615*a* may include "NotificationTopic:

Media Update; TelevisionShow: News; Time: 10 minutes," representing the news will begin being televised in 10 minutes.

In some embodiments, the requested content 615a may be in natural language. For example, the requested content 615a may be "meeting with John is starting in 15 minutes." For further example, the requested content 615a may be "you received an email from Jane 2 minutes ago." In another example, the requested content 615a may be "the Seahawks game is starting in 30 minutes." For further example, the requested content 615a may be "it will start raining in about 45 minutes." In another example, the requested content 615a may be "a red sedan, having license plate ABCD1234, from Bob's taxi service will be arriving in about 3 minutes at 123 First Street." For further example, the requested content 615a may be "your dish soap order is expected to be delivered in about 45 minutes." In another example, the requested content 615a may be "the news will begin in 10 minutes."

The requested content 615a may be accompanied by (i.e., associated with) metadata. In some embodiments, the metadata may include a single user identifier corresponding to a single user to receive the requested content 615a. In some embodiments, the metadata may include a group identifier corresponding to a group of users to receive the requested content 615a. In some embodiments, the metadata may include multiple user and/or group identifiers corresponding to multiple users and/or user groups to receive the requested content 615a.

In some embodiments, the metadata may include a user identifier(s) and/or group identifier(s) stored in the profile storage 870. In at least some embodiments, the metadata may include an encoded user identifier corresponding to a user identifier stored in the profile storage 870. In some embodiments, the metadata may include an encoded group identifier corresponding to a group identifier stored in the profile storage 870. In some embodiments, to maintain user privacy, the second content publisher 435b may not have access to a user identifier and/or group identifier stored in the profile storage 870. In these embodiments, the metadata may include an identifier that uniquely corresponds to a particular user identifier and/or group identifier stored in the profile storage 870.

In some embodiments, the metadata may indicate a validity duration of the requested content 615a. In other words, the metadata may indicate an amount of time (e.g., minutes, hours, days, etc.) that the requested content 615a is valid for. In other embodiments, the second content publisher 435b may indicate a validity duration of a content topic when the second content publisher 435b registers with the notification system 500 to provide supplemental content to users thereof. In such embodiments, the metadata may include a content topic (e.g., email notification, sporting event update, etc.), and the notification system 500 may determine the content topic in the metadata, determine the requested content 615a and metadata was received from the second content publisher 435b, and, based on the foregoing, determine a validity duration of the requested content 615a.

In some embodiments, the metadata may indicate an output type the second content publisher 435b recommends be used to notify the user(s) and/or user group(s) of the requested content 615a. For example, the metadata may represent indication of the requested content 615a should be conducted by activating a light indicator (e.g., a light ring, light emitting diode (LED), etc.) in a particular manner (e.g., exhibit a particular color, blink in a particular manner, etc.); displaying a GUI element, such as a banner, card, or the like;

vibrating in a particular manner (e.g., at a particular vibration strength, particular vibration pattern, etc.); and/or using some other notification mechanism.

In some embodiments, the metadata may indicate an output type the second content publisher 435b recommends be used to output the requested content 615a. For example, the metadata may indicate the requested content 615a should be output as synthesized speech. For further example, the metadata may indicate the requested content 615a should be output using a display. As another example, the metadata may indicate the requested content 615a should be output both as synthesized speech and using a display. In a further example, the metadata may indicate the requested content 615a may be output either as synthesized speech or using a display.

In some embodiments, the metadata may include a second content publisher identifier corresponding to the second content publisher 435b.

In some embodiments, the second content publisher 435b may send the requested content 615a and associated metadata to the event bus 535 via an API. In some embodiments, the notification system 500 may be configured with a first API for sending inferred content to the event bus 535, and a second API for sending requested content to the event bus 535. In some embodiments, the notification system 500 may be configured with a single API for sending supplemental content (i.e., inferred content and requested content) to the event bus 535. In such embodiments, supplemental content may be associated with metadata indicating whether the supplemental content is inferred or requested. Additionally or alternatively, in such embodiments, the metadata may include a content topic, and the notification system 500 may determine whether associated supplemental content is inferred or requested based on the content topic.

The event bus 535 may communicate with a requested content storage 620. The requested content storage 620 may be implemented by the notification system 500. When the metadata, associated with the requested content 615a, includes a user identifier, the requested content storage 620 may store an association between requested content 615b (corresponding to the requested content 615a), the user identifier, and the metadata. When the metadata, associated with the requested content 615a, includes more than one user identifier, the requested content storage 620 may store an association between the requested content 615b, the metadata, and each of the more than one user identifiers. When the metadata, associated with the requested content 615a, includes a group identifier, the requested content storage 620 may store an association between the requested content 615b, the group identifier, and the metadata. Additionally or alternatively, when the metadata, associated with the requested content 615a, includes a group identifier, the notification system 500 may determine one or more user identifiers associated with the group identifier, and the requested content storage 620 may store an association between the requested content 615b, the metadata, and each of the one or more user identifiers associated with the group identifier.

In some situations, the requested content storage 620 may store more than one requested content associated with a single user or group identifier at a point in time. In some embodiments, the notification system 500 may be configured to determine a score (e.g., confidence score, probability score, etc.) representing requested content should in fact be output to a user. The requested content storage 620 may associate requested content with its respective score such that the requested contents associated with a single user or group identifier may effectively be ranked within the requested content storage 620 according to priority of output.

In some embodiments, the requested content 615b may be a copy of the requested content 615a. For example, the requested contents 615a/615b may both be a structured, non-natural language formatted requested content.

In some embodiments, the notification system 500 may receive the requested content 615a in a structured, non-natural language form, but the requested content storage 620 may store the requested content 615b in a natural language form. In some embodiments, the notification system 500 may use a template-based approach to generate the natural language formatted requested content 615b. A template may include natural language with portions (e.g., variables) to be populated with information from the structured, non-natural language requested content 615a. A template may be associated with a content publisher 435. A template may additionally or alternatively be associated with a content topic. In some embodiments, the notification system 500 may perform one or more art-known/industry-known natural language generation techniques using the structured, non-natural language requested content 615 to generate the corresponding natural language requested content 615b.

In some embodiments, the subscription component 510 (of the notification system 500) may confirm the intended user and/or group or users subscribed to receive the requested content 615a prior to storing the requested content 615b in the requested content storage 620. For example, the subscription component 510 may determine the user identifier and/or group identifier associated with the requested content 615a, and determine (in a subscription storage) whether the user and/or group identifier is associated with an identifier of the second content publisher 435b (and optionally the content topic represented in the metadata associated with the requested content 615a). If the subscription component 510 determines the user and/or group of users has not subscribed to receive the requested content 615a (e.g., the subscription storage is not storing an association between the user and/or group identifier and an identifier of the second content publisher 435b, and optionally the content topic), the subscription component 510 may prevent the requested content 615b from being stored in the requested content storage 620. Conversely, if the subscription component 510 determines the user and/or group of users has subscribed to receive the requested content 615a (e.g., the subscription storage is storing an association between the user and/or group identifier and an identifier of the second content publisher 435b, and optionally the content topic), the subscription component 510 may store the requested content 615b in the requested content storage 620.

As described above, the notification system 500 may be configured to store supplemental content in two separate storages (i.e., store inferred content in the inferred content storage 610 and requested content in the requested content storage 620). In some embodiments, the notification system 500 may store all supplemental content in a single supplemental content storage (not illustrated). In such embodiments, in addition to the data associations detailed above, each supplemental content in the single supplemental content storage may be associated with data indicating whether the supplemental content is inferred or requested.

It will be appreciated that the foregoing processing and storage with respect to the inferred content 605b and requested content 615b may be performed with respect to additional inferred content and/or requested content intended for a same user and/or group of users.

After receiving the requested content 615a from the second content publisher 435b (and optionally after storing the requested content 615b in the requested content storage 620), the event bus 535 may publish event data 625 representing the requested content 615a has been received (or the requested content 615b has been stored). The delivery management component 525 subscribes to receiving such event data 625. Upon receiving the event data 625, the delivery management component 525 may determine whether the user and/or group of users should be notified that the requested content 615b is available for output.

The user and/or group of users (and more particularly the user and/or group profile data of the user and/or group of users) may be associated with one or more user devices 110 configured to notify the user and/or group of users using one or more techniques. For example, the user and/or group of users may be associated with one or more user devices 110 configured to notify the user, that the requested content 615b is available for output, by activating a light indicator (e.g., a light ring, light emitting diode (LED), etc.) in a particular manner (e.g., exhibit a particular color, blink in a particular manner, etc.); displaying a GUI element, such as a banner, card, or the like; vibrating in a particular manner (e.g., at a particular vibration strength, particular vibration pattern, etc.); and/or use some other mechanism. The delivery management component 525 may determine which device(s) 110 and which notification mechanism(s) should be used to notify the user and/or group of users of that the requested content 615b is available for output.

The delivery management component 525 may determine how to notify the user(s) of the requested content 615b based on device characteristics. The event data 625 may include the user and/or group identifier associated with the requested content 615b in the requested content storage 620. The delivery management component 525 may query the profile storage 870 for device characteristic data associated with one or more device identifiers associated with the user and/or group identifier. A given user device 110's device characteristic data may represent, for example, whether the user device 110 has a light(s) capable of indicating the requested content 615b is available for output, whether the user device 110 includes or is otherwise in communication with a display capable of indicating the requested content 615b is available for output, and/or whether the user device 110 includes a haptic component capable of indicating the requested content 615b is available for output.

The delivery management component 525 may indicate the requested content 615b is available for output based on the device characteristic data. For example, if the delivery management component 525 receives first device characteristic data representing a first user device 110a includes a light(s), the delivery management component 525 may send, to the first user device 110a, a first command 635a to activate the light(s) in a manner that indicates the requested content 615b is available for output. In some situations, two or more devices of the user and/or group of users may be capable of indicating the requested content 615b is available for output using lights of the two or more devices. In such situations, the delivery management component 525 may send, to each of the two or more devices, a command to cause the respective device's light(s) to indicate the requested content 615b is available for output.

The delivery management component 525 may additionally or alternatively receive second device characteristic data representing a second user device 110b includes or is otherwise in communication with a display. In response to receiving the second device characteristic data, the delivery management component 525 may send, to the second user device 110b, a second command 635b to display text, an image, a popup graphical element (e.g., a banner) that indicates the requested content 615b is available for output. For example, the displayed text may correspond to "you have an unread notification." But the text may not include specifics of the requested content 615b. An example of the second command 635b may be a mobile push command.

In some situations, two or more devices of the user and/or group of users may be capable of indicating the requested content 615b is available for output by displaying content. In such situations, the delivery management component 525 may send, to each of the two or more devices, a command to cause the respective device to display content indicating the requested content 615b is available for output.

The delivery management component 525 may additionally or alternatively receive third device characteristic data representing a third user device 110c includes a haptic component. In response to receiving the device characteristic data, the delivery management component 525 may send, to the third user device 110c, a third command 635c to vibrate in a manner that indicates the requested content 615b is available for output.

The delivery management component 525 may determine how to indicate the requested content 615b is available for output based on a user and/or group preference(s) corresponding to the user and/or group identifier associated with the requested content 615b in the requested content storage 620. For example, the delivery management component 525 may query the delivery preference component 515 for one or more indication preferences associated with the user and/or group identifier. An indication preference may indicate whether requested content is to be indicated using a light indicator, displayed content, vibration, and/or some other mechanism. An indication preference may indicate requested content, corresponding to a particular content topic, is to be indicated using a light indicator, displayed content, vibration, and/or some other mechanism.

The delivery management component 525 may additionally or alternatively determine how to indicate the requested content 615b is available for output based on a preference of the second content publisher 435b that provided the requested content 615a. For example, during offline operations, the second content publisher 435b may indicate requested content is to be indicated using a light indicator, displayed content, vibration, and/or some other mechanism. For further example, during offline operations, the second content publisher 435b may indicate requested content, corresponding to a particular content topic, is to be indicated using a light indicator, displayed content, vibration, and/or some other mechanism. In another example, the second content publisher 435b may indicate, at runtime, how the requested content 615a is to be indicated. For example, the requested content 615a may be associated with metadata representing how the requested content 615a is to be indicated to the user and/or group of users. The delivery management component 525 may query the delivery preference component 515 for one or more indication preferences associated with the identifier of the second content publisher 435b, and optionally the content topic associated with the requested content 615a.

In some situations, the delivery preference component 515 may determine and send, to the delivery management component 525, a user preference(s) and a content publisher preference(s) for indicating the requested content 615b is available for output. The delivery management component 525 may give priority to the user preference(s) in situations where the user preference(s) does not conform with the content publisher preference(s) (e.g., the user preference(s) indicates the requested content 615b is to be indicated using a light(s), but the content publisher preference(s) indicates the requested content 615b is to be indicated using displayed content).

In some situations, the delivery management component 525 may determine no user device 110 of the user and/or group of users is capable of indicating the requested content 615b as preferred by either a user preference(s) or a content publisher preference(s). In such situations, the delivery management component 525 may cause the device(s) 110 of the user and/or group of users to indicate the requested content 615b according to characteristics of the device(s) 110.

In some situations, while the device(s) 110 is indicating the requested content 615b is available for output, the event bus 535 may receive additional requested content intended for the same user and/or group of users. Thus and in some embodiments, after receiving the event data 625, the delivery management component 525 may determine whether a device(s) 110 of the user and/or group of users is presently indicating the requested content 615b is available for output.

As part of the foregoing determination, the delivery management component 525 may determine a user and/or group identifier represented in the event data 625. If the event data 625 includes an encoded user and/or group identifier, the delivery management component 525 may perform one or more art-known/industry-known decoding techniques on the encoded user and/or group identifier to determine the corresponding user and/or group identifier. If the event data 625 includes a unique identifier as described previously, the delivery management component 525 may use a table (including unique identifiers associated with respective user and/or group identifiers) to determine the unique identifier is associated with a particular user and/or group identifier.

After receiving or determining the user and/or group identifier, the delivery management component 525 may determine one or more device identifiers (e.g., device serial numbers) associated with the user and/or group identifier. In other words, the delivery management component 525 determines one or more device identifiers corresponding to one or more user devices 110 registered to a user and/or group of users corresponding to the user and/or group identifier.

Thereafter, the delivery management component 525 may determine whether at least one of the one or more device identifiers is associated with data (e.g., a flag or other indicator) representing a user device(s) 110 is presently indicating requested content is available for output. If the delivery management component 525 determines a device(s) 110 is presently indicating requested content is available for output, the delivery management component 525 may cease processing with respect to the event data 625 (and not send an additional command(s) to the user device(s) 110). Conversely, if the delivery management component 525 determines no user devices 110 of the user and/or group of users are presently indicating requested content is available for output, the delivery management component 525 may determine how the requested content 615b is to be indicated to the user and/or group of users (as described herein above).

Figure 7:
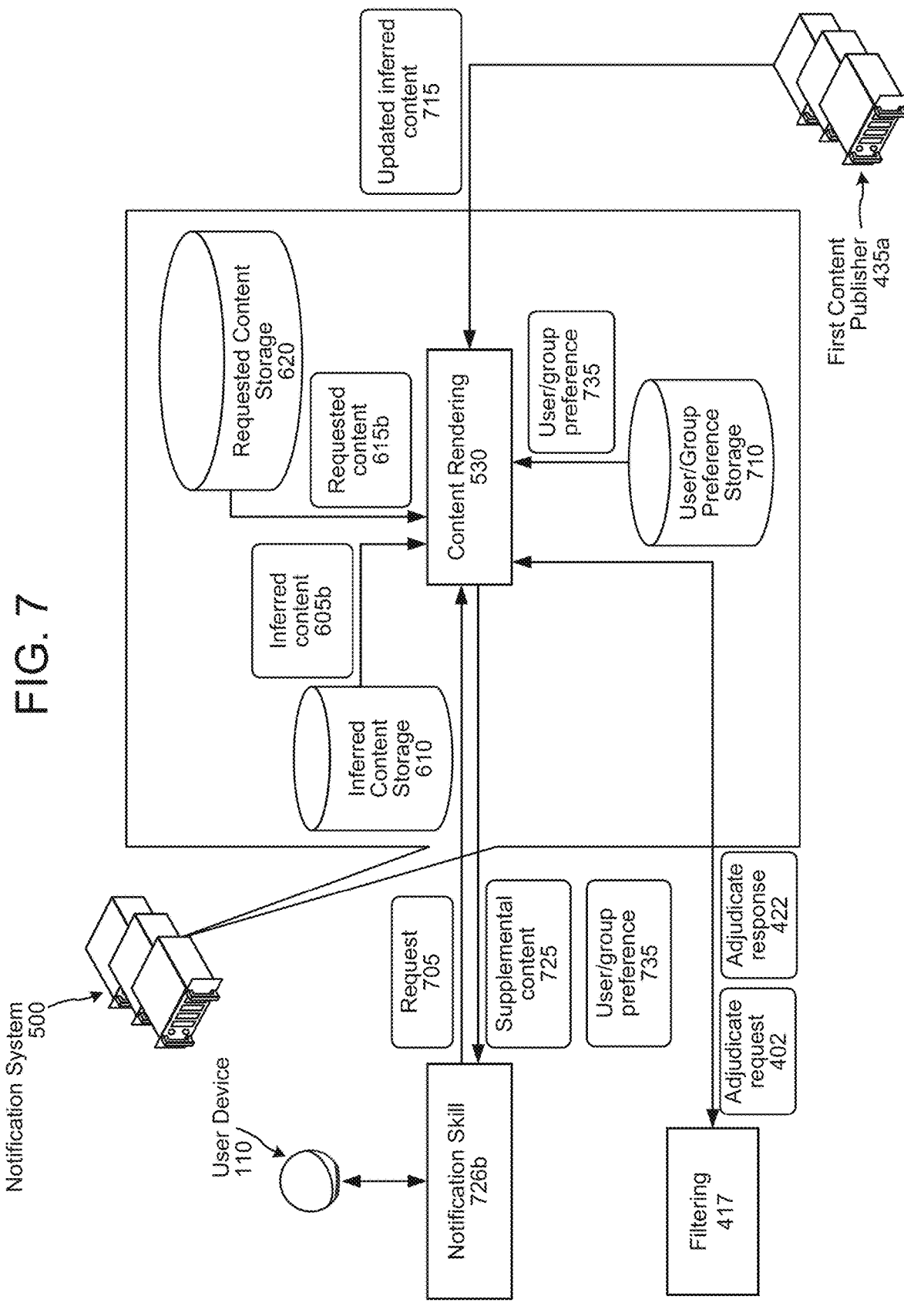
FIG. 7 is a conceptual diagram of components for outputting requested and inferred content using the notification system, according to embodiments of the present disclosure.

Referring to FIG. 7, sometime while the at least one user device 110 of the user and/or group of users is indicating the requested content 615b is available for output, a user device 110 of the user and/or group of users may receive a user input to output supplemental content(s) of the user and/or group of users. For example, the user device 110 may receive audio corresponding to a spoken natural language user input to output supplemental content(s). An example of such a spoken natural language user input may be "what are my notifications," "output my notifications," and the like. For further example, the user device 110 may receive a textual (e.g., typed) natural language user input to output supplemental content(s). In another example, the user device 110 may include or otherwise be associated with a camera that captures a sequence of images representing the user 105 performing a gesture (an example of a user input) to output supplemental content(s). In a further example, the user device 110 may include a button or display a virtual button (or other graphical user interface (GUI) element capable of being interacted with by the user 105), and the user device 110 may detect the user 105 interacting with the button or other GUI element (an example of a user input) to output supplemental content(s).

In some embodiments, the user device 110 may send data, representing the user input, to the system component(s) 120 for processing. In some instances, the user device 110 may be configured to communicate with (i.e., send data to and received data from) the system component(s) 120 via an application installed on the user device 110 and associated with the system component(s) 120. Such an application may be referred to as a companion application. An example of such an application is the Amazon Alexa application that may be installed on a smart phone or tablet.

The user device 110 and/or system component(s) 120 (depending on the components illustrated in FIGS. 8-9 being implemented) processes data representing the user input (e.g., audio data representing a spoken natural language user input, text data representing a text-based natural language user input, data representing a performed gesture, data representing a button interaction, etc.) to determine skill input data (e.g., NLU output data) representing the user input requests supplemental content(s) be output, and including a user and/or group identifier associated with the user device 110 (that captured the user input) and/or user 105 (that provided the user input). In response, the user device 110/system component(s) 120 may send the skill input data to a notification skill 726b.

The notification skill 726b processes the skill input data to determine the skill input data represents supplemental content(s) is to be output, and includes the user and/or group identifier. In response to such processing, the notification skill 726b generates request data 705 including the user and/or group identifier and requesting supplemental content(s) associated with the user and/or group identifier. The notification skill 726b sends the request data 705 to the content rendering component 530 of the notification system 500.

In response to receiving the request data 705, the content rendering component 530 queries the requested content storage 620 for requested content associated with the user and/or group identifier represented in the request data 705. In response, the content rendering component 530 receives at least the requested content 615b. Moreover, in response to receiving the request data 705, the content rendering component 530 queries the inferred content storage 610 for inferred content associated with the user and/or group identifier represented in the request data 705. In response, the content rendering component 530 receives at least the inferred content 605b.

Since the inferred content 605b may not be output until after the user or group of users is notified of the requested content 615b, it will be appreciated that a duration of time may occur between when the notification system 500 stores the inferred content 605b in the inferred content storage 610 and when the notification skill 726b sends the request data 705 to the content rendering component 530. In some situations, the inferred content 605b may be outdated or otherwise need updating prior to being output. For example, if the inferred content 605b is a shopping recommendation that includes a number of available products, the inferred content 605b may need to be updated to reflect a number of available products at the time of output to the user and/or group of users.

In view of the foregoing, the content rendering component 530 may determine the inferred content 605b was received from the first content publisher 435a (e.g., based on an identifier of the first content publisher 435a being associated with the inferred content 605b in the inferred content storage 610). Thereafter, the content rendering component 530 may send an update content request to the first content publisher 435a. The update content request may include an identifier uniquely identifying the inferred content 605b to the first content publisher 435a. In some embodiments, this identifier may be represented in the metadata associated with the inferred content 605a/705b. In some embodiments, the content rendering component 530 may send the update content request via a serial peripheral interface (SPI). As such, if the content rendering component 530 receives multiple inferred contents from the inferred content storage 610, the content rendering component 530 may send a respective update content request to two or more different content publishers 435 via the SPI.

In response to receiving the update content request, the first content publisher 435a may determine the inferred content 605b as stored by the first content publisher 435a, and may generate updated inferred content 715 therefrom. In some embodiments, the updated inferred content 715 may be in a structured, non-natural language format. In some embodiments, the updated inferred content 715 may be in a natural language format. In some embodiments, the first content publisher 435a may perform art-known/industry-known natural language generation processing to generate the updated inferred content 715.

For example, if the inferred content 605b corresponds to "a deal just started for [product name]," the first content publisher 435a may determine (in response to receiving the update content request) that 95% of the product has been sold, and the updated inferred content 715 may be generated to correspond to "a deal for [product name] is 85% sold out" or "a deal for [product name] is almost sold out." As such, it will be appreciated that the first content publisher 435a may generate the updated inferred content 715 based on information that became available to the first content publisher 435a after the first content publisher 435a sent the inferred content 605a to the notification system 500.

In some embodiments, in response to receiving the update content request, the first content publisher 435a may determine additional inferred content that became available after sending the inferred content 605a to the notification system 500. In such embodiments, the first content publisher 435a may perform natural language generation (or other) processing to generate the updated inferred content 715 to correspond to the inferred content 605b and the additional inferred content. For example, if the inferred content 605b is a shopping recommendation for a first product, the additional inferred content may be a shopping recommendation for a second product that became on sale after the inferred content 605*a* was originally sent to the notification system 500.

In some embodiments, the content rendering component 530 may determine a rating associated with a content publisher 435 (or other value representing the content publisher 435 will generate the updated inferred content 715 without including profanity or other adult-only content), and may only send the update content request to the content publisher 435 if the rating (or other value) satisfies a condition (e.g., meets or exceeds a threshold rating/value). Such processing configures the content rendering component 530 to only send an update content request to a content publisher 435 trusted by the content rendering component 530, as in some embodiments the content rendering component 530 may not be configured to check the updated inferred content 715 for profanity or other adult-only content. The rating or other value may be based at least in part on user feedback data received from users of the system 100 with respect to previous data generated by the content publisher 435.

In some embodiments, the first content publisher 435*a* may not generate the updated inferred content 715 in response to receiving the update content request (e.g., in situations wherein the first content publisher 435*a* is unaware of any updated or additional inferred content).

In some embodiments, rather than sending the inferred content 605*a* to the event bus 535, the first content publisher 435*a* may send, to the event bus 535, data indicating the first content publisher 435*a* wants inferred content to be output to the user or group of users. In such embodiments and in response to receiving the request data 705, the content rendering component 530 may query the first content publisher 435*a* for inferred content, and the first content publisher 435*a* may in turn send the updated inferred content 715 to the content rendering component 530.

The content rendering component 530 sends, to the notification skill 726*b*, supplemental content 725. In some embodiments, the supplemental content 725 may include at least the requested content 615*b* and the inferred content 605*b* (e.g., in the situation where the first content publisher 435*a* does not send the updated inferred content 715 to the content rendering component 530). In at least some embodiments, the supplemental content 725 may include at least the requested content 615*b* and the updated inferred content 715.

In at least some embodiments, the supplemental content 725 may only include the requested content 615*b*. For example, upon receiving the inferred content 605*b* or updated inferred content 715, the content rendering component 530 may send an adjudicate request 402, corresponding to the inferred content 605*b* or updated inferred content 715, to the filtering component 417. The filtering component 417 may then process as described herein to generate adjudicate response data 422 for the inferred content 605*b* or updated inferred content 715. If the adjudicate response data 422 indicates the inferred content 605*b* or updated inferred content 715 should not be output, the content rendering component 530 may, in response to receiving the adjudicate response data 422, not include the inferred content 605*b* or updated inferred content 715 in the supplemental content 725.

In some embodiments, the content rendering component 530 may only include the inferred content 605*b*, or updated inferred content 715, in the supplemental content 725 if the inferred content 605*b*, or updated inferred content 715, corresponds to a same content topic (or domain) as the requested content 615*b*.

Additionally, in response to receiving the request data 705, the content rendering component 530 may query a user/group preference storage 710 (which may be stored by the notification system 500) for user/group preference data 735 associated with the user and/or group identifier, and may send the user/group preference data 735 to the notification skill 726*b*. The user/group preference data 735 may represent one or more user/group preferences for ordering the output of supplemental contents. For example, a user/group preference may represent a certain content topic is to be output prior to any other content topic. For further example, a user/group preference may represent a first content topic is to be output prior to a second content topic.

The user/group preference data 735 may represent one or more user/group preferences regarding output of supplemental content on specific device types. For example, a user/group preference may represent inferred content is to be output using a specific device type, using a specific output type (e.g., synthesized speech, displayed content, etc.), and/or at a specific time of day.

Whereas the content rendering component 530 may be configured to send all data, required to output supplemental content, to the notification skill 726*b*, the notification skill 726*b* may be configured to construct the output to the user. The notification skill 726*b* may generate an ordering (of the supplemental contents) based on the user/group preference data 735 and/or one or more default ordering rules (which may order supplemental contents based on content topic (e.g., inferred v. requested, shopping v. system feature/functionality, sporting event score update v. new email, etc.)). In some embodiments, the notification skill 726*b* may implement a rules engine that processes the user/group preference data 735 and the default ordering rule(s) to determine the ordering. In some embodiments, the notification skill 726*b* may implement a heuristics-based algorithm (or other type of algorithm) that takes into consideration the user/group preference data 735 and the default ordering rule(s) for determining the ordering. In at least some embodiments, the notification skill 726*b* may implement a machine learning model that processes the user/group preference data 735 and the default ordering rule(s) to determine the ordering.

The notification skill 726*b* may determine how the supplemental contents should be output. For example, the notification skill 726*b* may determine the supplemental contents should be output as synthesized speech. For further example, the notification skill 726*b* may determine the supplemental contents should be displayed. In another example, the notification skill 726*b* may determine the supplemental contents should be both output as synthesized speech and displayed.

The notification skill 726*b* may determine the inferred content 605*b*, or the updated inferred content 715, should not be output based on how the supplemental contents are to be output. For example, the notification skill 726*b* may determine the user/group preference data 735 indicates a content topic is to be output using a specific mechanism (e.g., synthesized speech and/or displayed), may determine the inferred content 605*b* or updated inferred content 715 corresponds to the content topic, determine the supplemental contents are to be output using a mechanism other than the user/group preferred mechanism, and based thereon determine the inferred content 605*b* or updated inferred content 715 should not be output.

In some embodiments, the notification skill 726*b* may determine supplemental content to be output was received by the notification skill 726*b* in a structured, non-natural language format. In some embodiments, the notification skill 726*b* may use an art-known/industry-known template-based approach to generate natural language supplemental content corresponding to the structured, non-natural language supplemental content. In some embodiments, the notification skill 726*b* may use an art-known/industry-known natural language generation processing-based approach to generate natural language supplemental content corresponding to the structured, non-natural language supplemental content.

In embodiments where the notification skill 726*b* determines the supplemental contents are to be output as audio, the notification skill 726*b* may send a respective natural language representation of each supplemental content to be output to the TTS component 880, and the TTS component 880 may perform TTS processing on each instance of natural language supplemental content to generate different instances of audio data including synthesized speech corresponding to respective natural language supplemental content. The notification skill 726*b* may then cause the different audio data (corresponding to the different natural language synthesized speech of the different supplemental contents) to be sent to the user device 110 (in situations wherein the notification skill 726*b* is not implemented by the user device 110) and output by the user device 110 in the order determined by the notification skill 726*b*. This may include the notification skill 726*b* causing order data to be sent to the user device 110, with the order data representing the order determined by the notification skill 726*b*.

In some embodiments, the notification skill 726*b* may generate ordered natural language supplemental contents corresponding to the different instances of the natural language supplemental content in the order determined by the notification skill 726*b*. In such embodiments, the notification skill 726*b* may send the ordered natural language supplemental contents to the TTS component 880, and the TTS component 880 may perform TTS processing on the ordered natural language supplemental contents to generate a single instance of audio data including synthesized speech corresponding to the ordered natural language supplemental content. The notification skill 726*b* may then cause the audio data to output by the user device 110.

Additionally or alternatively, the notification skill 726*b* may determine the natural language supplemental contents are to be displayed as natural language text. In such embodiments, the notification skill 726*b* may cause different instances of natural language text data (each corresponding to a different instance of natural language supplemental content) to be displayed by the user device 110 (using a display of or otherwise associated with the user device 110) in the order determined by the notification skill 726*b*. This may include the notification skill 726*b* causing order data to be sent to the user device 110, with the order data representing the order determined by the notification skill 726*b*. In some embodiments, the notification skill 726*b* may send a single instance of natural language text data (corresponding to the ordered natural language supplemental contents) to be sent to the user device 110 for output. In some embodiments, the user device 110 may display natural language text (corresponding to different supplemental contents) in a list format.

In some embodiments, the notification skill 726*b* may cause one or more devices, associated with the same user and/or group profile data as the user device 110 that captured the user input requesting supplemental content be output, to output the foregoing synthesized speech and/or display the foregoing natural language text.

Figure 8:
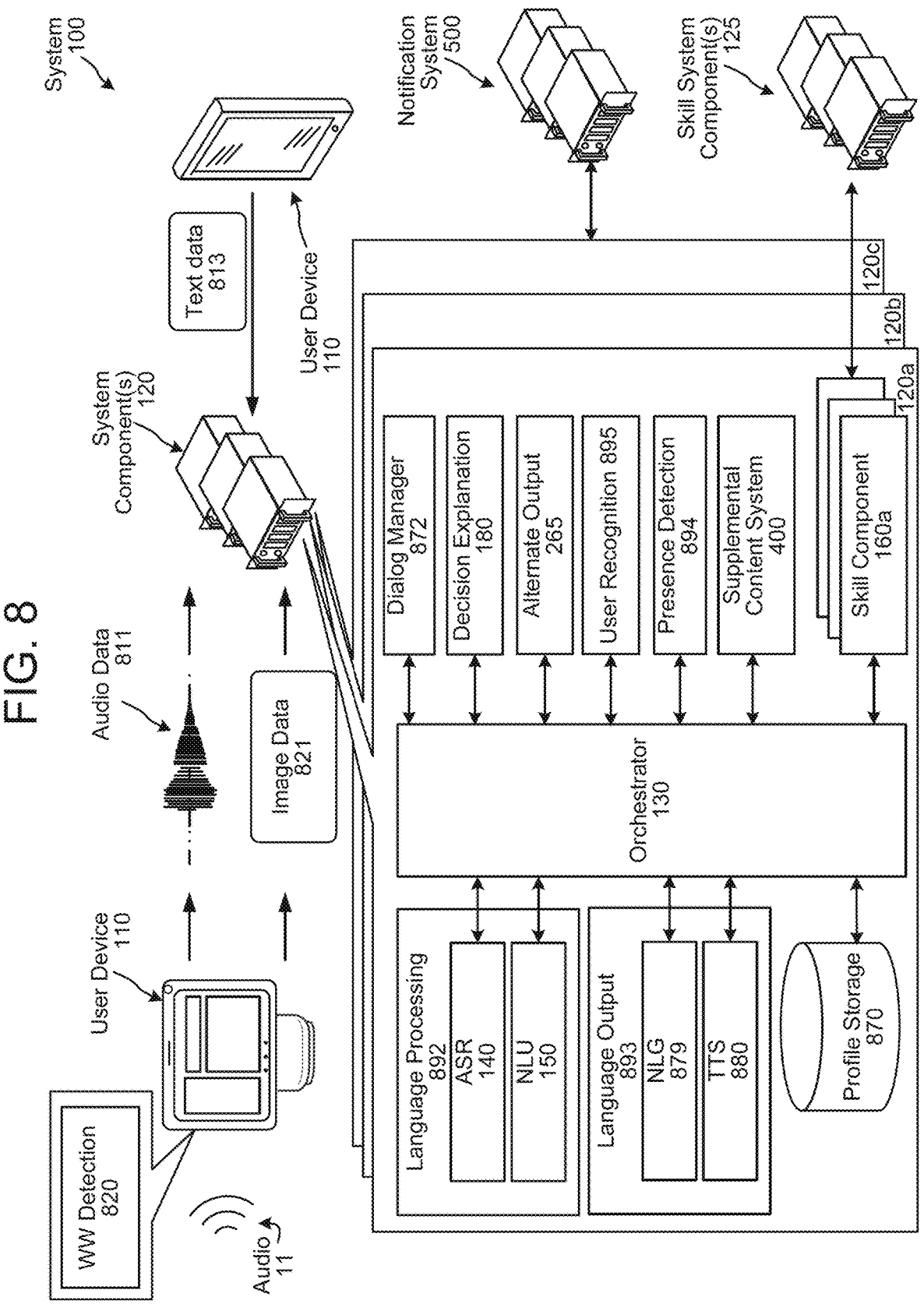
FIG. 8 is a conceptual diagram of components of the system, according to embodiments of the present disclosure.

The system 100 may operate using various components as described in FIG. 8. The various components may be located on same or different physical devices. Communication between various components may occur directly or across a network(s) 199. The user device 110 may include audio capture component(s), such as a microphone or array of microphones of a user device 110, captures audio 11 and creates corresponding audio data. Once speech is detected in audio data representing the audio 11, the user device 110 may determine if the speech is directed at the user device 110/system component(s) 120. In at least some embodiments, such determination may be made using a wakeword detection component 820. The wakeword detection component 820 may be configured to detect various wakewords. In at least some examples, each wakeword may correspond to a name of a different digital assistant. An example wakeword/digital assistant name is "Alexa." In another example, input to the system may be in form of text data 813, for example as a result of a user typing an input into a user interface of user device 110. Other input forms may include indication that the user has pressed a physical or virtual button on user device 110, the user has made a gesture, etc. The user device 110 may also capture images using camera(s) 1218 of the user device 110 and may send image data 821 representing those image(s) to the system component(s) 120. The image data 821 may include raw image data or image data processed by the user device 110 before sending to the system component(s) 120. The image data 821 may be used in various manners by different components of the system to perform operations such as determining whether a user is directing an utterance to the system, interpreting a user command, responding to a user command, etc.

The wakeword detection component 820 of the user device 110 may process the audio data, representing the audio 11, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 820 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 820 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 820 and/or input is detected by an input detector, the user device 110 may "wake" and begin transmitting audio data 811, representing the audio 11, to the system component(s) 120. The audio data 811 may include data corresponding to the wakeword; in other embodiments, the portion of the audio corresponding to the wakeword is removed by the user device 110 prior to sending the audio data 811 to the system component(s) 120. In the case of touch input detection or gesture based input detection, the audio data may not include a wakeword.

In some implementations, the system 100 may include more than one system component(s) 120. The system component(s) 120 may respond to different wakewords and/or perform different categories of tasks. Each system component(s) 120 may be associated with its own wakeword such that speaking a certain wakeword results in audio data be sent to and processed by a particular system. For example, detection of the wakeword "Alexa" by the wakeword detection component 820 may result in sending audio data to system component(s) 120*a* for processing while detection of the wakeword "Computer" by the wakeword detector may result in sending audio data to system component(s) 120*b* for processing. The system may have a separate wakeword and system for different skills/systems (e.g., "Dungeon Master" for a game play skill/system component(s) 120*c*) and/or such skills/systems may be coordinated by one or more skill component(s) 160 of one or more system component(s) 120.

The user device 110 may also include a system directed input detector (not illustrated). (The system component(s) 120 may also include a system directed input detector which may operate in a manner similar to that implemented by the user device 110.) The system directed input detector may be configured to determine whether an input to the system (for example speech, a gesture, etc.) is directed to the system or not directed to the system (for example directed to another user, etc.). The system directed input detector may work in conjunction with the wakeword detection component 820. If the system directed input detector determines an input is directed to the system, the user device 110 may "wake" and begin sending captured data for further processing (for example, processing audio data using the language processing 892/1192, processing captured image data using an image processing component or the like). If data is being processed the user device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector determines an input is not directed to the system (such as a speech or gesture directed to another user) the user device 110 may discard the data and take no further action for processing purposes. In this way the system 100 may prevent processing of data not directed to the system, thus protecting user privacy. As an indicator to the user, however, the system may output an audio, visual, or other indicator when the system directed input detector is determining whether an input is potentially device directed. For example, the system may output an orange indicator while considering an input, and may output a green indicator if a system directed input is detected. Other such configurations are possible.

Upon receipt by the system component(s) 120, the audio data 811 may be sent to an orchestrator component 130. The orchestrator component 130 may include memory and logic that enables the orchestrator component 130 to transmit various pieces and forms of data to various components of the system, as well as perform other operations as described herein.

The orchestrator component 130 may send the audio data 811 to a language processing component 892. The language processing component 892 (sometimes also referred to as a spoken language understanding (SLU) component) includes an automatic speech recognition (ASR) component 140 and a natural language understanding (NLU) component 150. The ASR component 140 may transcribe the audio data 811 into text data. The text data output by the ASR component 140 represents one or more than one (e.g., in the form of an N-best list) ASR hypotheses representing speech represented in the audio data 811. The ASR component 140 interprets the speech in the audio data 811 based on a similarity between the audio data 811 and pre-established language models. For example, the ASR component 140 may compare the audio data 811 with models for sounds (e.g., acoustic units such as phonemes, senons, phones, etc.) and sequences of sounds to identify words that match the sequence of sounds of the speech represented in the audio data 811. The ASR component 140 sends the text data generated thereby to an NLU component 150, via, in some embodiments, the orchestrator component 130. The text data sent from the ASR component 140 to the NLU component 150 may include a single top-scoring ASR output or may include an N-best list including multiple top-scoring ASR hypotheses. An N-best list may additionally include a respective score associated with each ASR output represented therein.

The language processing system 892 may further include a NLU component 150. The NLU component 150 may receive the text data from the ASR component. The NLU component 150 may attempts to make a semantic interpretation of the phrase(s) or statement(s) represented in the text data input therein by determining one or more meanings associated with the phrase(s) or statement(s) represented in the text data. The NLU component 150 may determine an intent representing an action that a user desires be performed and may determine information that allows a device (e.g., the user device 110, the system component(s) 120, a skill component 160, a skill system component(s) 125, etc.) to execute the intent. For example, if the text data corresponds to "play the 5th Symphony by Beethoven," the NLU component 150 may determine an intent that the system output music and may identify "Beethoven" as an artist/composer and "5th Symphony" as the piece of music to be played. For further example, if the text data corresponds to "what is the weather," the NLU component 150 may determine an intent that the system output weather information associated with a geographic location of the user device 110. In another example, if the text data corresponds to "turn off the lights," the NLU component 150 may determine an intent that the system turn off lights associated with the user device 110 or the user 105. However, if the NLU component 150 is unable to resolve the entity—for example, because the entity is referred to by anaphora such as "this song" or "my next appointment"—the language processing system 892 can send a decode request to another language processing system 892 for information regarding the entity mention and/or other context related to the utterance. The language processing system 892 may augment, correct, or base results data upon the audio data 811 as well as any data received from the other language processing system 892.

The NLU component 150 may return NLU output data (which may include tagged text data, indicators of intent, etc.) back to the orchestrator component 130. The orchestrator component 130 may forward the NLU results data to a skill component(s) 160. If the NLU output data includes a single NLU output, the NLU component 150 and the orchestrator component 130 may direct the NLU output data to the skill component(s) 160 associated with the NLU output. If the NLU output data includes an N-best list of NLU outputs, the NLU component 150 and the orchestrator component 130 may direct the top scoring NLU output to a skill component(s) 160 associated with the top scoring NLU output. The system may also include a post-NLU ranker which may incorporate other information to rank potential interpretations determined by the NLU component 150. The local user device 110 may also include its own post-NLU ranker, which may operate similarly to the post-NLU ranker.

A skill component may be software running on the system component(s) 120 that is akin to a software application. That is, a skill component 160 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 160. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 160 may operate in conjunction between the system component(s) 120 and other devices, such as the user device 110, in order to complete certain functions. Inputs to a skill component 160 may come from speech processing interactions or through other interactions or input sources. A skill component 160 may include hardware, software, firmware, or the like that may be dedicated to a particular skill component 160 or shared among different skill components 160.

A skill support system component(s) 125 may communicate with a skill component(s) 160 within the system component(s) 120 and/or directly with the orchestrator component 130 or with other components. A skill support system component(s) 125 may be configured to perform one or more actions. An ability to perform such action(s) may sometimes be referred to as a "skill." That is, a skill may enable a skill support system component(s) 125 to execute specific functionality in order to provide data or perform some other action requested by a user. For example, a weather service skill may enable a skill support system component(s) 125 to provide weather information to the system component(s) 120, a car service skill may enable a skill support system component(s) 125 to book a trip with respect to a taxi or ride sharing service, an order pizza skill may enable a skill support system component(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 160 dedicated to interacting with the skill support system component(s) 125. Unless expressly stated otherwise, reference to a skill, skill device, or skill component may include a skill component 160 operated by the system component(s) 120 and/or skill operated by the skill support system component(s) 125. Moreover, the functionality described herein as a skill or skill may be referred to using many different terms, such as an action, bot, app, or the like. The skill component 160 and or skill support system component(s) 125 may return output data to the orchestrator component 130.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) 120 and/or the user device 110 may include the decision explanation component 180, which may process as described herein above.

The system(s) 100 may include a dialog manager component 872 that manages and/or tracks a dialog between a user and a device. The dialog manager component 872 may associate a dialog session identifier with the dialog upon identifying that the user is engaging in a dialog with the user. The dialog manager component 872 may track a user input and the corresponding system generated response to the user input as a turn. The dialog session identifier may correspond to multiple turns of user input and corresponding system generated response. The dialog manager component 872 may transmit data identified by the dialog session identifier directly to the orchestrator component 130 or other component. Depending on system configuration the dialog manager component 872 may determine the appropriate system generated response to give to a particular utterance or user input of a turn. Or creation of the system generated response may be managed by another component of the system (e.g., the language output component 893, NLG 879, orchestrator component 130, etc.) while the dialog manager component 872 selects the appropriate responses. Alternatively, another component of the system component(s) 120 may select responses using techniques discussed herein. The text of a system generated response may be sent to a TTS component 880 for creation of audio data corresponding to the response. The audio data may then be sent to a user device (e.g., user device 110) for ultimate output to the user. Alternatively (or in addition) a dialog response may be returned in text or some other form.

The dialog manager component 872 may receive the ASR output/outputs (i.e., text data) and make a semantic interpretation of the phrase(s) or statement(s) represented therein. That is, the dialog manager component 872 determines one or more meanings associated with the phrase(s) or statement(s) represented in the text data based on words represented in the text data. The dialog manager component 872 determines a goal corresponding to an action that a user desires be performed as well as pieces of the text data that allow a device (e.g., the user device 110, the system component(s) 120, a skill component 160, a skill system component(s) 125, etc.) to execute the intent. If, for example, the text data corresponds to "what is the weather," the dialog manager component 872 may determine that that the system component(s) 120 is to output weather information associated with a geographic location of the user device 110. In another example, if the text data corresponds to "turn off the lights," the dialog manager component 872 may determine that the system component(s) 120 is to turn off lights associated with the device(s) 110 or the user(s) 5.

The dialog manager component 872 may send the results data to one or more skill component(s) 160. If the results data includes a single output, the orchestrator component 130 may send the results data to the skill component(s) 160 associated with the output. If the results data includes an N-best list of hypotheses, the orchestrator component 130 may send the top scoring output to a skill component(s) 160 associated with the top scoring output.

The system component(s) 120 includes a language output component 893. The language output component 893 includes a natural language generation (NLG) component 879 and a text-to-speech (TTS) component 880. The NLG component 879 can generate text for purposes of TTS output to a user. For example, the NLG component 879 may generate text corresponding to instructions corresponding to a particular action for the user to perform. The NLG component 879 may generate appropriate text for various outputs as described herein. The NLG component 879 may include one or more trained models configured to output text appropriate for a particular input. The text output by the NLG component 879 may become input for the TTS component 880 (e.g., output text data discussed below). Alternatively or in addition, the TTS component 880 may receive text data from a skill component 160 or other system component for output.

The NLG component 879 may include a trained model. The NLG component 879 generates text data from dialog data received by the dialog manager component 872 such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the TTS component 880.

The TTS component 880 may generate audio data (e.g., synthesized speech) from text data using one or more different methods. Text data input to the TTS component 880 may come from a skill component 160, the orchestrator component 130, or another component of the system. In one method of synthesis called unit selection, the TTS component 880 matches text data against a database of recorded speech. The TTS component 880 selects matching units of recorded speech and concatenates the units together to form audio data. In another method of synthesis called parametric synthesis, the TTS component 880 varies parameters such as frequency, volume, and noise to create audio data including an artificial speech waveform. Parametric synthesis uses a computerized voice generator, sometimes called a vocoder.

The user device 110 may include still image and/or video capture components such as a camera or cameras to capture one or more images. The user device 110 may include circuitry for digitizing the images and/or video for transmission to the system component(s) 120 as image data. The user device 110 may further include circuitry for voice command-based control of the camera, allowing a user 105 to request capture of image or video data. The user device 110 may process the commands locally or send audio data 811 representing the commands to the system component(s) 120 for processing, after which the system component(s) 120 may return output data that can cause the user device 110 to engage its camera.

Upon receipt by the system component(s) 120, the image data may be sent to the orchestrator component 130. The orchestrator component 130 may send the image data 1021 to an image processing component. The image processing component can perform computer vision functions such as object recognition, modeling, reconstruction, etc. For example, the image processing component may detect a person, face, etc. (which may then be identified using user recognition component 1095). The device may also or alternatively include an image processing component which operates similarly to image processing component of the system component(s) 120.

In some implementations, the image processing component can detect the presence of text in an image. In such implementations, the image processing component can recognize the presence of text, convert the image data to text data, and send the resulting text data via the orchestrator component 130 to the language processing component 892 for processing by the NLU component 150.

The system component(s) 120 may include a user recognition component 895 that recognizes one or more users using a variety of data. However, the disclosure is not limited thereto, and the user device 110 may include a user recognition component 995 instead of and/or in addition to user recognition component 895 of the system component(s) 120 without departing from the disclosure. User recognition component 995 operates similarly to user recognition component 895.

The user recognition component 895 may take as input the audio data 811 and/or text data output by the ASR component 140. The user recognition component 895 may perform user recognition by comparing audio characteristics in the audio data 811 to stored audio characteristics of users. The user recognition component 895 may also perform user recognition by comparing biometric data (e.g., fingerprint data, iris data, etc.), received by the system in correlation with the present user input, to stored biometric data of users assuming user permission and previous authorization. The user recognition component 895 may further perform user recognition by comparing image data (e.g., including a representation of at least a feature of a user), received by the system in correlation with the present user input, with stored image data including representations of features of different users. The user recognition component 895 may perform additional user recognition processes, including those known in the art.

The user recognition component 895 determines scores indicating whether user input originated from a particular user. For example, a first score may indicate a likelihood that the user input originated from a first user, a second score may indicate a likelihood that the user input originated from a second user, etc. The user recognition component 895 also determines an overall confidence regarding the accuracy of user recognition operations.

Output of the user recognition component 895 may include a single user identifier corresponding to the most likely user that originated the user input. Alternatively, output of the user recognition component 895 may include an N-best list of user identifiers with respective scores indicating likelihoods of respective users originating the user input. The output of the user recognition component 895 may be used to inform NLU processing as well as processing performed by other components of the system.

The system component(s) 120/user device 110 may include a presence detection component 894/994 that determines the presence and/or location of one or more users using a variety of data.

The system 100 (either on user device 110, system component(s) 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device;

internet connectivity information; user bibliographic information; subscription information, as well as other information.

The profile storage 870 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 110, the user profile (associated with the presented login information) may be updated to include information about the user device 110, for example, with an indication that the device is currently in use. Each user profile may include identifiers of skills that the user has enabled. When a user enables a skill, the user is providing the system component(s) 120 with permission to allow the skill to execute with respect to the user's natural language user inputs. If a user does not enable a skill, the system component(s) 120 may not invoke the skill to execute with respect to the user's natural language user inputs.

The profile storage 870 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 870 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system component(s) 120 may also include a sentiment detection component that may be configured to detect a sentiment of a user from audio data representing speech/utterances from the user, image data representing an image of the user. The sentiment detection component may be included in system component(s) 120, as illustrated in FIG. 8, although the disclosure is not limited thereto and the sentiment detection component may be included in other components without departing from the disclosure. For example, the sentiment detection component may be included in the user device 110, as a separate component, etc. Sentiment detection component may operate similarly to sentiment detection component. The system component(s) 120 may use the sentiment detection component to, for example, customize a response for a user based on an indication that the user is happy or frustrated.

Figure 9:
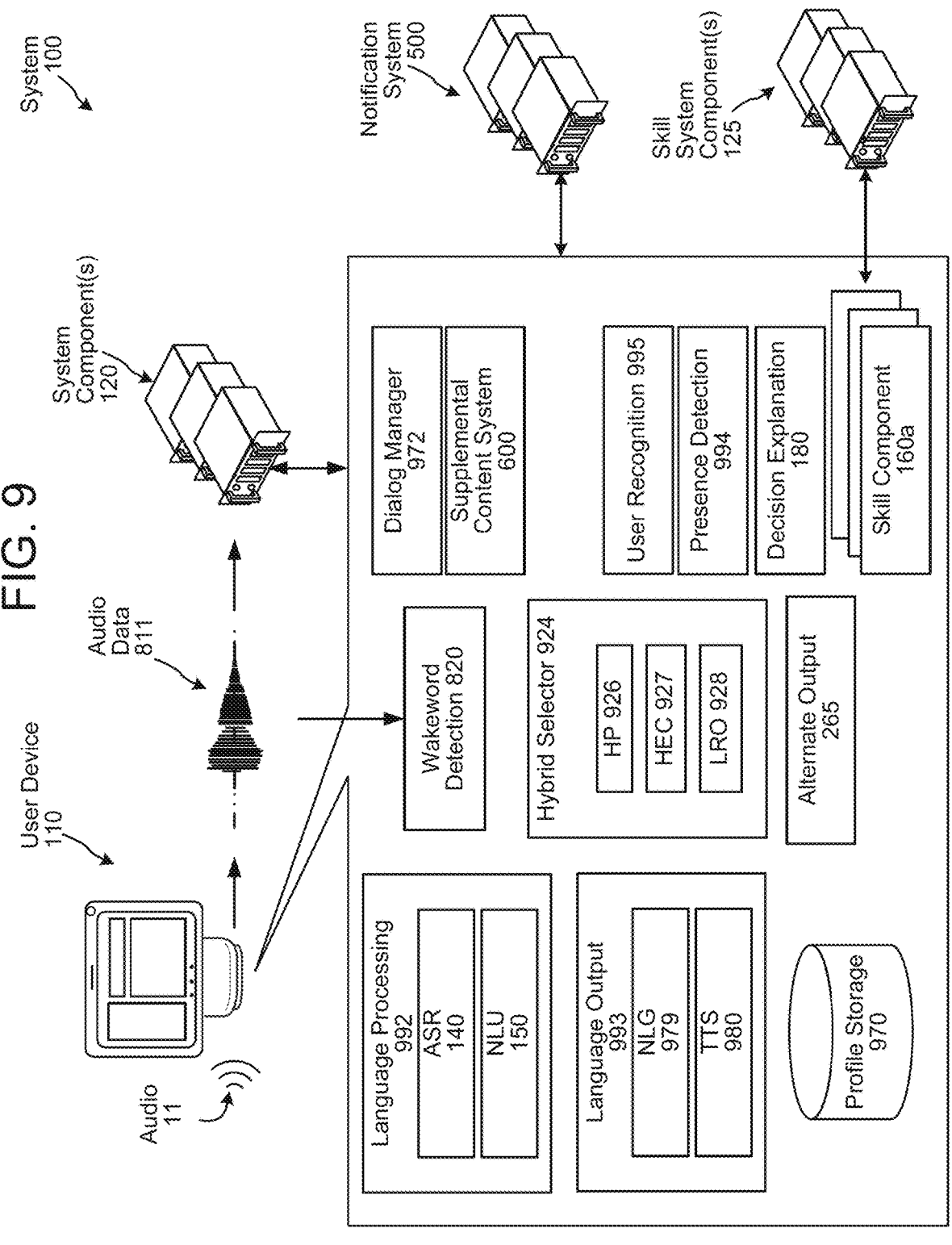
FIG. 9 is a conceptual diagram illustrating components that may be included in a device, according to embodiments of the present disclosure.

Although the components of FIG. 8 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure. FIG. 9 illustrates such a configured user device 110.

In at least some embodiments, the system component(s) 120 may receive the audio data 811 from the user device 110, to recognize speech corresponding to a spoken input in the received audio data 811, and to perform functions in response to the recognized speech. In at least some embodiments, these functions involve sending directives (e.g., commands), from the system component(s) 120 to the user device 110 (and/or other user devices 110) to cause the user device 110 to perform an action, such as output an audible response to the spoken input via a loudspeaker(s), and/or control secondary devices in the environment by sending a control command to the secondary devices.

Thus, when the user device 110 is able to communicate with the system component(s) 120 over the network(s) 199, some or all of the functions capable of being performed by the system component(s) 120 may be performed by sending one or more directives over the network(s) 199 to the user device 110, which, in turn, may process the directive(s) and perform one or more corresponding actions. For example, the system component(s) 120, using a remote directive that is included in response data (e.g., a remote response), may instruct the user device 110 to output an audible response (e.g., using TTS processing performed by an on-device TTS component 980) to a user's question via a loudspeaker(s) of (or otherwise associated with) the user device 110, to output content (e.g., music) via the loudspeaker(s) of (or otherwise associated with) the user device 110, to display content on a display of (or otherwise associated with) the user device 110, and/or to send a directive to a secondary device (e.g., a directive to turn on a smart light). It is to be appreciated that the system component(s) 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., a video call) between the user 105 and another user, and so on.

As noted with respect to FIG. 8, the user device 110 may include a wakeword detection component 820 configured to compare the audio data 811 to stored models used to detect a wakeword (e.g., "Alexa") that indicates to the user device 110 that the audio data 811 is to be processed for determining NLU output data (e.g., slot data that corresponds to a named entity, label data, and/or intent data, etc.). In at least some embodiments, a hybrid selector 924, of the user device 110, may send the audio data 811 to the wakeword detection component 820. If the wakeword detection component 820 detects a wakeword in the audio data 811, the wakeword detection component 820 may send an indication of such detection to the hybrid selector 924. In response to receiving the indication, the hybrid selector 924 may send the audio data 811 to the system component(s) 120 and/or the ASR component 140. The wakeword detection component 820 may also send an indication, to the hybrid selector 924, representing a wakeword was not detected. In response to receiving such an indication, the hybrid selector 924 may refrain from sending the audio data 811 to the system component(s) 120, and may prevent the ASR component

140 from further processing the audio data 811. In this situation, the audio data 811 can be discarded.

The user device 110 may conduct its own speech processing using on-device language processing components, such as an SLU/language processing component 992 (which may include an ASR component 140 and an NLU component 150), similar to the manner discussed herein with respect to the SLU component 892 (or ASR component 140 and the NLU component 150) of the system component(s) 120. Language processing component 992 may operate similarly to language processing component 892, ASR component 140 may operate similarly to ASR component 140 and NLU component 150 may operate similarly to NLU component 150. The user device 110 may also internally include, or otherwise have access to, other components such as one or more skill components 160 capable of executing commands based on NLU output data or other results determined by the user device 110/system component(s) 120 (which may operate similarly to skill components 160), a user recognition component 995 (configured to process in a similar manner to that discussed herein with respect to the user recognition component 895 of the system component(s) 120), profile storage 970 (configured to store similar profile data to that discussed herein with respect to the profile storage 870 of the system component(s) 120), or other components. In at least some embodiments, the profile storage 970 may only store profile data for a user or group of users specifically associated with the user device 110. Similar to as described above with respect to skill component 160, a skill component 160 may communicate with a skill system component(s) 125. The user device 110 may also have its own language output component 993 which may include NLG component 979 and TTS component 980. Language output component 993 may operate similarly to language output component 893, NLG component 979 may operate similarly to NLG component 879 and TTS component 980 may operate similarly to TTS component 880.

In at least some embodiments, the on-device language processing components may not have the same capabilities as the language processing components of the system component(s) 120. For example, the on-device language processing components may be configured to handle only a subset of the natural language user inputs that may be handled by the system component(s) 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s) 120. If the user device 110 attempts to process a natural language user input for which the on-device language processing components are not necessarily best suited, the language processing results determined by the user device 110 may indicate a low confidence or other metric indicating that the processing by the user device 110 may not be as accurate as the processing done by the system component(s) 120.

The hybrid selector 924, of the user device 110, may include a hybrid proxy (HP) 926 configured to proxy traffic to/from the system component(s) 120. For example, the HP 926 may be configured to send messages to/from a hybrid execution controller (HEC) 927 of the hybrid selector 924. For example, command/directive data received from the system component(s) 120 can be sent to the HEC 927 using the HP 926. The HP 926 may also be configured to allow the audio data 811 to pass to the system component(s) 120 while also receiving (e.g., intercepting) this audio data 811 and sending the audio data 811 to the HEC 927.

In at least some embodiments, the hybrid selector 924 may further include a local request orchestrator (LRO) 928 configured to notify the ASR component 140 about the availability of new audio data 811 that represents user speech, and to otherwise initiate the operations of local language processing when new audio data 811 becomes available. In general, the hybrid selector 924 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 110 receives directive data from the system component(s) 120 and chooses to use that remotely-determined directive data.

Thus, when the audio data 811 is received, the HP 926 may allow the audio data 811 to pass through to the system component(s) 120 and the HP 926 may also input the audio data 811 to the on-device ASR component 140 by routing the audio data 811 through the HEC 927 of the hybrid selector 924, whereby the LRO 928 notifies the ASR component 140 of the audio data 811. At this point, the hybrid selector 924 may wait for response data from either or both of the system component(s) 120 or the local language processing components. However, the disclosure is not limited thereto, and in some examples the hybrid selector 924 may send the audio data 811 only to the local ASR component 140 without departing from the disclosure. For example, the user device 110 may process the audio data 811 locally without sending the audio data 811 to the system component(s) 120.

The local ASR component 140 is configured to receive the audio data 811 from the hybrid selector 924, and to recognize speech in the audio data 811, and the local NLU component 150 is configured to determine a user intent from the recognized speech, and to determine how to act on the user intent by generating NLU output data which may include directive data (e.g., instructing a component to perform an action). Such NLU output data may take a form similar to that as determined by the NLU component 150 of the system component(s) 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU output (output by the NLU component 150) may be selected as usable to respond to a natural language user input, and local response data may be sent (e.g., local NLU output data, local knowledge base information, internet search results, and/or local directive data) to the hybrid selector 924, such as a "ReadyToExecute" response. The hybrid selector 924 may then determine whether to use directive data from the on-device components to respond to the natural language user input, to use directive data received from the system component(s) 120, assuming a remote response is even received (e.g., when the user device 110 is able to access the system component(s) 120 over the network(s) 199), or to determine output audio requesting additional information from the user 105.

The user device 110 and/or the system component(s) 120 may associate a unique identifier with each natural language user input. The user device 110 may include the unique identifier when sending the audio data 811 to the system component(s) 120, and the response data from the system component(s) 120 may include the unique identifier to identify which natural language user input the response data corresponds.

In at least some embodiments, the user device 110 may include, or be configured to use, one or more skill components 160 that may work similarly to the skill component(s) 160 implemented by the system component(s) 120. The skill component(s) 160 may correspond to one or more domains that are used in order to determine how to act on a spoken input in a particular way, such as by outputting a directive that corresponds to the determined intent, and which can be processed to implement the desired operation. The skill component(s) 160 installed on the user device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 110 may be in communication with one or more skill system component(s) 125. For example, a skill system component(s) 125 may be located in a remote environment (e.g., separate location) such that the user device 110 may only communicate with the skill system component(s) 125 via the network(s) 199. However, the disclosure is not limited thereto. For example, in at least some embodiments, a skill system component(s) 125 may be configured in a local environment (e.g., home server and/or the like) such that the user device 110 may communicate with the skill system component(s) 125 via a private network, such as a local area network (LAN).

As used herein, a "skill" may refer to a skill component 160, a skill system component(s) 125, or a combination of a skill component 160 and a corresponding skill system component(s) 125.

Similar to the manner discussed with regard to FIG. 8, the local user device 110 may be configured to recognize multiple different wakewords and/or perform different categories of tasks depending on the wakeword. Such different wakewords may invoke different processing components of local user device 110 (not illustrated in FIG. 9). For example, detection of the wakeword "Alexa" by the wakeword detection component 820 may result in sending audio data to certain language processing components 992/skill component(s) 160 for processing while detection of the wakeword "Computer" by the wakeword detector may result in sending audio data to different language processing components 992/skill component(s) 160 for processing.

FIG. 10 is a block diagram conceptually illustrating a user device 110 that may be used with the system. FIG. 11 is a block diagram conceptually illustrating example components of a remote device, such as the natural language command processing system component(s) 120, which may assist with ASR processing, NLU processing, etc., and a skill system component(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 110 may operate locally to a user (e.g., within a same environment so the device may receive inputs and playback outputs for the user) the server/system component(s) 120 may be located remotely from the user device 110 as its operations may not require proximity to the user. The server/system component(s) 120 may be located in an entirely different location from the user device 110 (for example, as part of a cloud computing system or the like) or may be located in a same environment as the user device 110 but physically separated therefrom (for example a home server or similar device that resides in a user's home or business but perhaps in a closet, basement, attic, or the like). The system component(s) 120 may also be a version of a user device 110 that includes different (e.g., more) processing capabilities than other user device(s) 110 in a home/office. One benefit to the server/system component(s) 120 being in a user's home/business is that data used to process a command/return a response may be kept within the user's home, thus reducing potential privacy concerns.

Multiple systems (120/125) may be included in the overall system 100 of the present disclosure, such as one or more natural language processing system component(s) 120 for performing ASR processing, one or more natural language processing system component(s) 120 for performing NLU processing, one or more skill system component(s) 125, etc. In operation, each of these systems may include computer-readable and computer-executable instructions that reside on the respective device (120/125), as will be discussed further below.

Each of these devices (110/120/125) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120/125) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1002/1102).

Computer instructions for operating each device (110/120/125) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120/125) includes input/output device interfaces (1002/1102). A variety of components may be connected through the input/output device interfaces (1002/1102), as will be discussed further below. Additionally, each device (110/120/125) may include an address/data bus (1024/1124) for conveying data among components of the respective device. Each component within a device (110/120/125) may also be directly connected to other components in addition to (or instead of) being connected to other components across the bus (1024/1124).

Referring to FIG. 10, the user device 110 may include input/output device interfaces 1002 that connect to a variety of components such as an audio output component such as a speaker 1012, a wired headset or a wireless headset (not illustrated), or other component capable of outputting audio. The user device 110 may also include an audio capture component. The audio capture component may be, for example, a microphone 1020 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 110 may additionally include a display 1016 for displaying content. The user device 110 may further include a camera 1018.

Via antenna(s) 1022, the input/output device interfaces 1002 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device(s) 110, the natural language command processing system component(s) 120, or a skill system component(s) 125 may include their own dedicated processors, memory, and/or storage. Alternatively, one or more of the components of the device(s) 110, the natural language command processing system component(s) 120, or a skill system component(s) 125 may utilize the I/O interfaces (1002/1102), processor(s) (1004/1104), memory (1006/1106), and/or storage (1008/1108) of the device(s) 110, natural language command processing system component(s) 120, or the skill system component(s) 125, respectively. Thus, the ASR component 140 may have its own I/O interface(s), processor(s), memory, and/or storage; the NLU component 150 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 110, the natural language command processing system component(s) 120, and a skill system component(s) 125, as described herein, are illustrative, and may be located as a stand-alone device or may be included, in whole or in part, as a component of a larger device or system. As can be appreciated, a number of components may exist either on a system component(s) 120 and/or on user device 110. For example, language processing 892/1192 (which may include ASR 140/140), language output 893/1193 (which may include NLG 879/1179 and TTS 880/1180), etc., for example as illustrated in FIGS. 8 and 11. Unless expressly noted otherwise, the system version of such components may operate similarly to the device version of such components and thus the description of one version (e.g., the system version or the local version) applies to the description of the other version (e.g., the local version or system version) and vice-versa.

Figure 12:
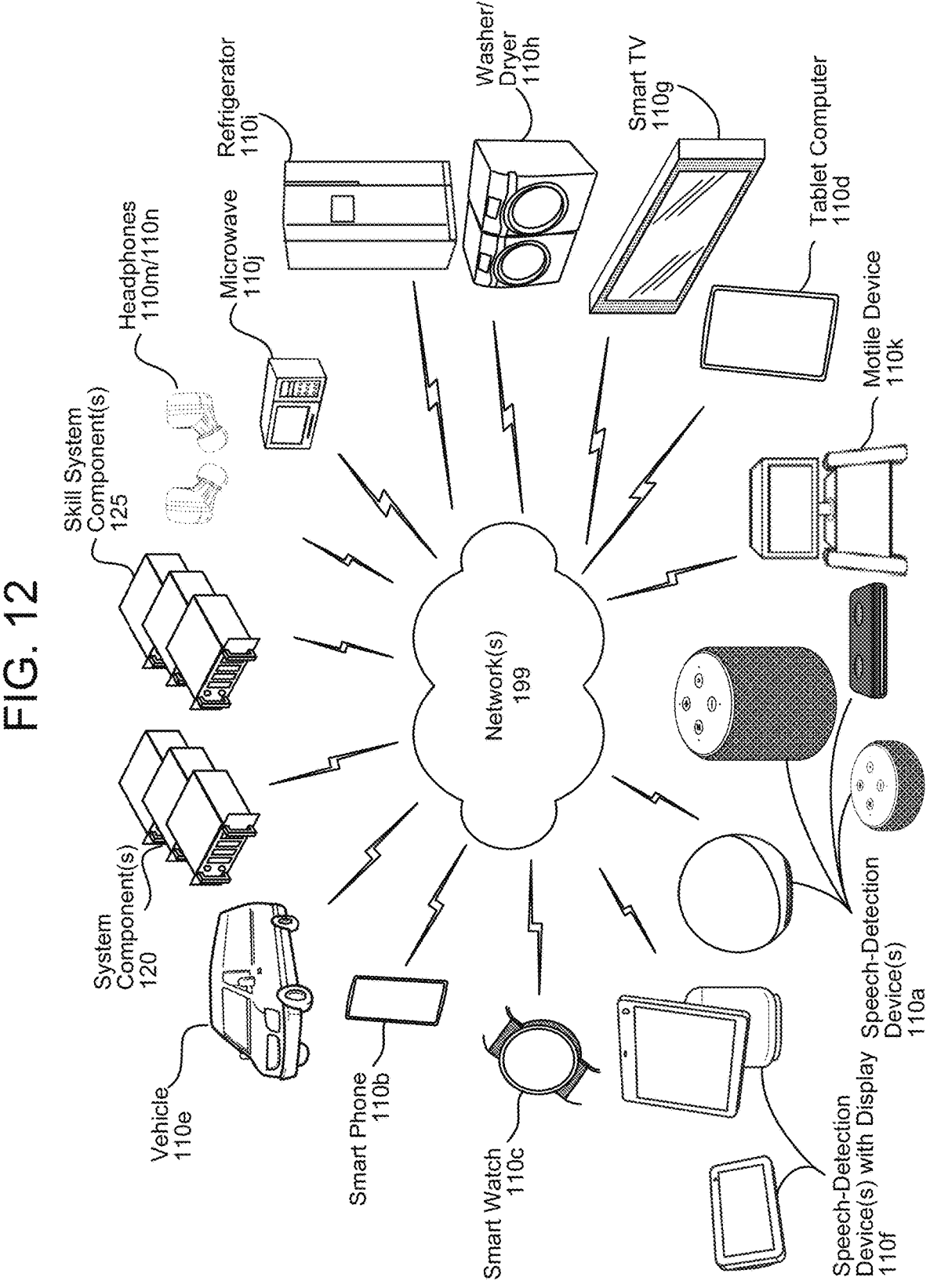
FIG. 12 illustrates an example of a computer network for use with the overall system, according to embodiments of the present disclosure.

As illustrated in FIG. 12, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection user device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile user device 110k (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 140, the NLU component 150, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving, from a device associated with a user profile, input audio data corresponding to a first spoken user input;
performing automatic speech recognition (ASR) processing using the input audio data to generate a first ASR output corresponding to a first transcript of the first spoken user input;

determining that natural language understanding (NLU) processing of the first ASR output results in an error condition;

based on determining that NLU processing of the first ASR output results in the error condition, determining a second ASR output corresponding to a second transcript of the first spoken user input;

performing NLU processing using the second ASR output to generate an NLU output including an intent corresponding to the first spoken user input;

using the NLU output, generating first output data responsive to the first spoken user input;

based on determining that NLU processing of the first ASR output results in the error condition, determining to present a natural language explanation of how the first output data was generated;

determining first history data associated with the user profile;

determining first context data associated with the first spoken user input;

processing the first history data and the first context data to generate second output data including the natural language explanation indicating the first output data was generated using the second ASR output based on determining that the NLU processing of the first ASR output results in the error condition;

processing the first history data and the first context data to generate a third ASR output corresponding to a predicted transcript of the first spoken user input that does not result in the error condition;

determining a similarity between the second ASR output and the third ASR output; and based on the similarity, causing the device to present the first output data in coordination with presenting the second output data.

2. The computer-implemented method of claim 1, further comprising:

processing, using a first encoder, the first history data to determine encoded history data;

processing, using a second encoder, the first context data to determine encoded context data;

processing, using a decoder, the encoded history data and the encoded context data to determine the second output data; and processing, using the decoder, the encoded history data and the encoded context data to determine the third ASR output.

3. The computer-implemented method of claim 1, further comprising:

determining second history data associated with the user profile;

storing the second history data in a storage;

querying the storage, using the first context data, to determine the first history data, wherein the first history data corresponds to a portion of the second history data corresponding to the first context data;

determining first input data including the first context data and the first history data; and processing the first input data to generate the second output data.

4. The computer-implemented method of claim 1, wherein:

the second ASR output is determined using a first trained machine learning (ML) component, the second output data is generated using a second trained ML component, and the method further comprises:

generating third output data requesting user feedback regarding the second output data;

causing the device to present the third output data;

receiving, from the device, input data corresponding to the user feedback; and based on the user feedback, determining at least one of an updated trained first ML component corresponding to the first trained ML component and an updated trained second ML component corresponding to the second trained ML component.

5. A computer-implemented method comprising:

processing, using a first component configured to perform automatic speech recognition (ASR) processing, input audio data to generate first data corresponding to a transcript of the input audio data;

processing, using a second component, the first data to generate second data;

based on the second data, determining first output data responsive to the input audio data;

based on the second data being generated by the second component, determining to present a natural language explanation of how the first output data was determined;

determining first history data associated with a user profile, the user profile being associated with the input audio data;

based on the first history data and determining to present the natural language explanation of how the first output data was determined, determining second output data corresponding to the natural language explanation indicating that the first output data was determined using the second data; and causing presentation of the first output data in coordination with presentation of the second output data.

6. The computer-implemented method of claim 5, further comprising:

determining context data associated with the input audio data; and determining the second output data based on the context data.

7. The computer-implemented method of claim 5, further comprising:

determining context data associated with the input audio data;

processing, using a first encoder, the first history data to determine encoded history data;

processing, using a second encoder, the context data to determine encoded context data; and processing, using a decoder, the encoded history data and the encoded context data to determine the second output data.

8. The computer-implemented method of claim 5, wherein the input audio data corresponds to a first user input, and the method further comprises:

receiving third data corresponding to the first user input;

determining a first entity included in the first user input;

determining knowledge data associated with the first entity and a second entity, the knowledge data representing a relationship between the first entity and the second entity; and determining the second output data based on the knowledge data.

9. The computer-implemented method of claim 5, further comprising:

determining second history data associated with the user profile;

storing the second history data in a storage;

determining context data associated with the input audio data;

querying the storage, using the context data, to determine the first history data, wherein the first history data corresponds to a portion of the second history data corresponding to the context data;

determining third data including the context data and the first history data; and determining the second output data based on the third data.

10. The computer-implemented method of claim 5, further comprising:

determining third output data using third data;

causing presentation of the third output data;

after causing presentation of the third output data, receiving fourth data corresponding to a first user input requesting an explanation regarding why the third output data was presented;

determining fourth output data corresponding to a second natural language explanation indicating the third output data was determined using the third data; and causing presentation of the fourth output data.

11. The computer-implemented method of claim 5, wherein:

the first data is determined using a first trained machine learning (ML) component, the second output data is determined using a second trained ML component, and the method further comprises:

generating third output data requesting user feedback regarding the second output data;

causing presentation of the third output data;

receiving third data corresponding to the user feedback; and based on the user feedback, determining at least one of an updated first trained ML component corresponding to the first trained ML component and an updated second trained ML component corresponding to the second trained ML component.

12. The computer-implemented method of claim 5, further comprising:

determining that natural language understanding (NLU) processing of the first data results in an error condition; and based on determining that NLU processing of the first data results in the error condition, generating the second data using the second component, wherein:

the second data corresponds to a second transcript of the input audio data, and determining to present the natural language explanation of how the first output data was determined is based on determining that NLU processing of the first data results in the error condition.

13. A computing system comprising:

at least one processor; and at least one memory comprising instructions that, when executed by the at least one processor, causes the computing system to:

process, using a first component configured to perform automatic speech recognition (ASR) processing, input audio data to generate first data corresponding to a transcript of the input audio data;

process, using a second component, the first data to generate second data;

based on the second data, determine first output data responsive to the input audio data;

based on the second data being generated by the second component, determine to present a natural language explanation of how the first output data was determined;

determine first history data associated with a user profile, the user profile being associated with the input audio data;

based on the first history data and determining to present the natural language explanation of how the first output data was determined, determine second output data corresponding to the natural language explanation indicating that the first output data was determined using the second data; and cause presentation of the first output data in coordination with presentation of the second output data.

14. The computing system of claim 13, wherein the at least one memory further comprises instructions that, when executed by the at least one processor, further cause the computing system to:

determine context data associated with the input audio data; and determine the second output data based on the context data.

15. The computing system of claim 13, wherein the at least one memory further comprises instructions that, when executed by the at least one processor, further cause the computing system to:

determine context data associated with the input audio data;

process, using a first encoder, the first history data to determine encoded history data;

process, using a second encoder, the context data to determine encoded context data; and process, using a decoder, the encoded history data and the encoded context data to determine the second output data.

16. The computing system of claim 13, wherein the input audio data corresponds to a first user input and wherein the at least one memory further comprises instructions that, when executed by the at least one processor, further cause the computing system to:

receive third data corresponding to the first user input;

determine a first entity included in the first user input;

determine knowledge data associated with the first entity and a second entity, the knowledge data representing a relationship between the first entity and the second entity; and determine the second output data based on the knowledge data.

17. The computing system of claim 13, wherein the at least one memory further comprises instructions that, when executed by the at least one processor, further cause the computing system to:

determine second history data associated with the user profile;

store the second history data in a storage;

determine context data associated with the input audio data;

query the storage, using the context data, to determine the first history data, wherein the first history data corresponds to a portion of the second history data corresponding to the context data;

determining third data including the context data and the first history data; and determine the second output data based on the third data.

18. The computing system of claim 13, wherein the at least one memory further comprises instructions that, when executed by the at least one processor, further cause the computing system to:

determine third output data using third data;

cause presentation of the third output data;

after causing presentation of the third output data, receive fourth data corresponding to a first user input requesting an explanation regarding why the third output data was presented;

determine fourth output data corresponding to a second natural language explanation indicating the third output data was determined using the third data; and cause presentation of the fourth output data.

19. The computing system of claim 13, wherein:

the first data is determined using a first trained machine learning (ML) component, the second output data is determined using a second trained ML component, and wherein the at least one memory further comprises instructions that, when executed by the at least one processor, further cause the computing system to:

generate third output data requesting user feedback regarding the second output data;

cause presentation of the third output data;

receive third data corresponding to the user feedback; and based on the user feedback, determine at least one of an updated first trained ML component corresponding to the first trained ML component and an updated second trained ML component corresponding to the second trained ML component.

20. The computing system of claim 13, wherein the at least one memory further comprises instructions that, when executed by the at least one processor, further cause the computing system to:

determine that natural language understanding (NLU) processing of the first data results in an error condition; and based on determining that NLU processing of the first data results in the error condition, generate the second data using the second component, wherein:

the second data corresponds to a second transcript of the input audio data, and determining to present the natural language explanation of how the first output data was determined is based on determining that NLU processing of the first data results in the error condition.

* * * * *